(12) United States Patent
Noh et al.

(10) Patent No.: US 10,547,361 B2
(45) Date of Patent: Jan. 28, 2020

(54) FEEDBACK APPARATUS AND METHOD IN MULTI-ANTENNA SYSTEM

(71) Applicants: Samsung Electronics Co., Ltd., Gyeonggi-do (KR); Yonsei University-Industry Foundation, Seoul (KR)

(72) Inventors: Hoon-Dong Noh, Gyeonggi-do (KR); Sooyong Choi, Seoul (KR); Youn-Sun Kim, Gyeonggi-do (KR); Kyungsik Min, Seoul (KR); Young-Woo Kwak, Gyeonggi-do (KR); Youngrok Jang, Seoul (KR)

(73) Assignees: Samsung Electronics Co., Ltd (KR); Yonsei University-Industry Foundation (KR)

( * ) Notice: Subject to any disclaimer, the term of this patent is extended or adjusted under 35 U.S.C. 154(b) by 0 days.

(21) Appl. No.: 15/913,349

(22) Filed: Mar. 6, 2018

(65) Prior Publication Data

US 2018/0262244 A1 Sep. 13, 2018

(30) Foreign Application Priority Data

Mar. 7, 2017 (KR) .................. 10-2017-0028781

(51) Int. Cl.
*H04B 7/0456* (2017.01)
*H04L 5/00* (2006.01)
*H04B 7/06* (2006.01)
*H04W 88/08* (2009.01)
*H04W 88/02* (2009.01)

(52) U.S. Cl.
CPC ......... *H04B 7/0469* (2013.01); *H04B 7/0478* (2013.01); *H04B 7/0626* (2013.01); *H04L 5/0048* (2013.01); *H04B 7/0486* (2013.01); *H04W 88/02* (2013.01); *H04W 88/08* (2013.01)

(58) Field of Classification Search
CPC ........................... H04B 7/0469; H04B 7/0478
See application file for complete search history.

(56) References Cited

U.S. PATENT DOCUMENTS

| 2013/0322361 | A1* | 12/2013 | Ko | H04B 7/0632 370/329 |
|---|---|---|---|---|
| 2016/0323022 | A1 | 11/2016 | Rahman et al. | |
| 2017/0195934 | A1* | 7/2017 | Kang | H04W 36/30 |
| 2017/0302480 | A1* | 10/2017 | Kim | H04B 7/04 |

FOREIGN PATENT DOCUMENTS

KR 1020160129767 11/2016

\* cited by examiner

*Primary Examiner* — Ross Varndell
(74) *Attorney, Agent, or Firm* — The Farrell Law Firm, P.C.

(57) ABSTRACT

Disclosed are feedback and transmission devices and methods in full-dimension multi-antenna systems using two-dimensional (2D) planar array antennas, wherein a UE estimates channel states each corresponding to a respective one of multiple domain channels by a reference signal received from a base station, and obtains precoding matrix indicators (PMIs) each corresponding to a respective one of the multiple domain channels and rank indicators (RIs) each corresponding to a respective one of the multiple domain channels based on the estimated channel states. The UE may determine a joint rank indicator (JRI) using the obtained PMIs and the RIs and transmit feedback information containing the determined JRI to the base station.

10 Claims, 16 Drawing Sheets

FEEDBACK APPARATUS AND METHOD IN MULTI-ANTENNA SYSTEM

CROSS-REFERENCE TO RELATED APPLICATION(S)

This application is based on and claims priority under 35 U.S.C. § 119 of Korean Patent Application No. 10-2017-0028781, filed on Mar. 7, 2017, in the Korean Intellectual Property Office, the disclosure of which is incorporated herein by reference in its entirety.

BACKGROUND

1. Field

The disclosure relates generally to electronic devices, and more particularly, to feedback and transmission devices and methods in full-dimension multi-antenna systems using two-dimensional (2D) planar array antennas.

2. Description of the Related Art

In order to meet the ever-increasing demand for wireless data traffic since the 4th generation (4G) communication system came to the market, there have been ongoing efforts to develop enhanced 5th generation (5G) communication systems or pre-5G communication systems, also referred to as beyond 4G network communication systems or post-long term evolution (LTE) systems.

For higher data transmit rates, 5G communication systems are considered to be implemented on ultra-high frequency bands (mmWave), such as 60 gigahertz (GHz). To mitigate pathloss on the ultra-high frequency band and increase the reach of radio waves, the 5G communication system considers beamforming, massive multi-input multi-output (MIMO), full dimensional MIMO (FD-MIMO), an array antenna, analog beamforming, and a large-scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

Other schemes under development for the 5G system include hybrid frequency shift keying (FSK) and quadrature amplitude modulation (QAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The FD-MIMO-supportive systems may support elevation beamforming and high-order multi-user MIMO, thereby increasing the frequency efficiency of wireless communication systems.

The antenna arrays may be prolonged when a number of antenna arrays are used in the FD-MIMO system. The use of 2D planar array antennas, which are antennas of a 2D planar array structure, may prevent the antenna array from prolonging due to the adoption of many antenna arrays.

FD-MIMO systems using 2D planar array antennas may support both elevation beamforming and azimuth beamforming, in which case the channel between the base station (or evolved nodeB (eNB)) and the user equipment (UE) may have three-dimensional (3D) characteristics. In this case, a need may exist for channel state information (CSI) reporting and a codebook operation scheme considering the 3D channel characteristics and azimuth beamforming and elevation beamforming. In other words, there should be prepared for the FD-MIMO system CSI reporting and a codebook operation scheme that reflect the 3D channel characteristics between the base station and the UE which may be generated by using 2D planar array antennas.

One approach may be enhancing the codebook for beam group estimation of double codebook considering the channel characteristics of both the azimuth domain and the elevation domain in the FD-MIMO system.

Hybrid CSI-reference signal (CSI-RS) technology has been proposed to reduce the overhead of the CSI procedure and RSs due to many antenna arrays in the FD-MIMO system. The CSI-RS technology has been suggested to operate non-precoded CSI-RS and beamformed CSI-RS as a single CSI procedure, and may maintain frequency efficiency performance and enable channel estimation using fewer reference signals than the number of antenna arrays. The hybrid CSI-RS technology may also reduce unnecessary use of the CSI procedure.

In a full-dimension multi-antenna system using 2D planar array antennas, channels between a base station and a UE may be represented as at least two separate domain channels, such as a 'first domain channel' and a 'second domain channel.'

In this case, the UE performs channel estimation for each of the first domain channel and the second domain channel and feeds the results of the per-channel estimation back to the base station, enabling the UE to efficiently perform channel estimation and the base station to efficiently use the information estimated by the UE.

In this case, the UE may feed back to the base station precoding matrix indicators (PMIs) which represent channel information, with the PMIs separated into a first PMI and a second PMI. When the base station transmits multiple layers, the base station may not remove an inter-layer interference due to the precoder obtained using the first PMI and the second PMI depending on the number of its antenna arrays and the number of antennas of the UE.

When the UE transmits the PMIs to the base station, with the PMIs divided into the first PMI and the second PMI, the UE may also feedback rank indicators (RIs) to the base station, with the RIs divided into a first RI and a second RI. The RI may indicate the maximum number of layers that may be transmitted upon data transmission.

In this case, the base station should the maximum number of layers transmittable, i.e., joint rank (JR), using the first RI and the second RI. However, the product of the first RI and the second RI are inconsistent with the JR in the conventional art.

As such, there is a need in the art for a method that corrects the aforesaid inconsistency in the conventional art, in the information sharing between a base station and a UE.

SUMMARY

An aspect of the present disclosure is to address at least the-mentioned problems and/or disadvantages and to provide at least the advantages described below. Accordingly, an aspect of the present disclosure is to provide an apparatus and method enabling a base station and at least one UE to share information regarding the JR in a full-dimension multi-antenna system using 2D planar array antennas.

Another aspect of the present disclosure is to provide a transmitting/receiving apparatus and method enabling a predicted JR to be consistent with an actual JR in a full-dimension multi-antenna system using 2D planar array antennas according to an embodiment.

Another aspect of the present disclosure is to provide a transmitting/receiving apparatus and method that reduce overhead due to reference signals and overhead due to feedback in a full-dimension multi-antenna system using 2D planar array antennas according to an embodiment.

According to an embodiment, a method for reporting feedback information to a base station by a user equipment (UE) in a full-dimension multi-antenna system using two-dimensional (2D) planar array antennas includes estimating channel states, each of the channel states corresponding to a respective one of multiple domain channels connecting the UE with the base station by a reference signal received from the base station, obtaining precoding matrix indicators (PMIs), each of the PMIs corresponding to a respective one of the multiple domain channels, and rank indicators (RIs), each of the RIs corresponding to a respective one of the multiple domain channels, based on the estimated channel states, determining a joint rank indicator (JRI) using the obtained PMIs and the RIs, and transmitting the feedback information containing the determined JRI to the base station.

According to an embodiment, a method for transmitting data to a UE by a base station in a full-dimension multi-antenna system using 2D planar array antennas includes transmitting an RS to the UE, receiving feedback information through the transmitted reference signal from the UE, determining a precoder and a zero-layer mapper using, at least, a JRI, PMIs, each of the PMIs corresponding to a respective one of multiple domain channels connecting the UE with the base station, and RIs, each of the RIs corresponding to a respective one of the multiple domain channels, the feedback information containing the JRI, the PMIs, and the RIs, and transmitting the data containing the zero layer to the UE using the determined zero-layer mapper and the determined precoder.

According to an embodiment, a UE reporting feedback information to a base station in a full-dimension multi-antenna system using 2D planar array antennas includes a communication unit configured to receive a reference signal from the base station and transmit the feedback information to the base station and a controller configured to estimate channel states, each of the channel states corresponding to a respective one of multiple domain channels connecting the UE with the base station by a reference signal received from the base station, obtain PMIs, each of the PMIs corresponding to a respective one of the multiple domain channels, and RIs, each of the RIs corresponding to a respective one of the multiple domain channels, based on the estimated channel states, determine a JRI using the obtained PMIs and the RIs, and configure the feedback information containing the determined JRI.

According to an embodiment, a base station transmitting data to a UE by a base station in a full-dimension multi-antenna system using 2D planar array antennas includes a communication unit configured to transmit an RS to the UE, receive feedback information through the transmitted RS from the UE, and transmit zero layer-containing data to the UE, and a controller configured to determine a precoder and a zero-layer mapper using, at least, a JRI, PMIs, each of the PMIs corresponding to a respective one of multiple domain channels connecting the UE with the base station, and RIs, each of the RIs corresponding to a respective one of the multiple domain channels, the feedback information containing the JRI, the PMIs, and the RIs and generate the zero layer-containing data using the determined precoder and the determined zero-layer mapper.

BRIEF DESCRIPTION OF THE DRAWINGS

The above and other aspects, features, and advantages of certain embodiments of the present disclosure will become apparent from the following description taken in conjunction with the accompanying drawings, in which.

DETAILED DESCRIPTION

Figure 1:
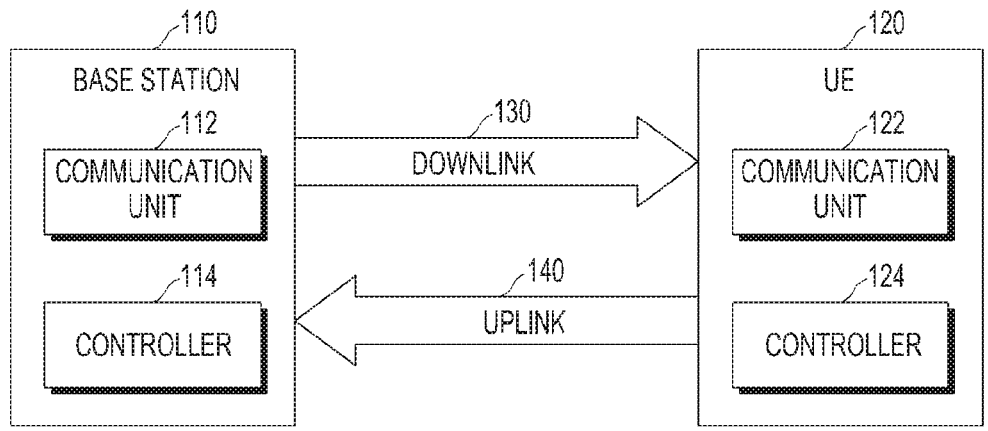
FIG. 1 illustrates configurations of a base station and a UE in a full-dimension multi-antenna system using 2D planar array antennas according to an embodiment.

Hereinafter, embodiments are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings. Detailed description of known functions and/or configurations will be omitted for the sake of clarity and conciseness.

As used herein, the expressions "have," "may have," "include," or "may include" indicate the existence of the feature and do not exclude the existence of other features.

As used herein, the expressions "A or B," "at least one of A and/or B," or "one or more of A and/or B" may include all possible combinations of A and B, i.e., may indicate any of (1) including at least one A, (2) including at least one B, and (3) including at least one A and at least one B.

As used herein, the terms "first" and "second" may use various components regardless of importance and/or order and are used to distinguish a component from another without limiting the components. For example, a first user device and a second user device may indicate different user devices from each other regardless of the order or importance of the devices, and a first component may be referred to as a second component, and vice versa without departing from the scope of the present disclosure.

It will be understood that when a first element is referred to as being operatively or communicatively "coupled with/to," or "connected with/to" a second element, the first element can be coupled or connected with/to the second element directly or via a third element. In contrast, it will be understood that when the first element is referred to as being "directly coupled with/to" or "directly connected with/to" the second element, no third element intervenes between the first and second elements.

As used herein, the expression "configured (or set) to" may be interchangeably used with the expressions "suitable for," "having the capacity to," "designed to," "adapted to," "made to," or "capable of" depending on circumstances. The expression "configured (or set) to" does not essentially indicate "specifically designed in hardware to," but instead, may indicate that a device can perform an operation together with another device or parts. For example, the expression "processor configured (or set) to perform A, B, and C" may indicate a generic-purpose processor, such as a central processing unit (CPU), graphic processing unit (GPU), or application processor (AP) that may perform the operations by executing one or more software programs stored in a memory device or an embedded processor for performing the operations.

The terms as used herein are provided merely to describe some embodiments thereof, but not to limit the scope of other embodiments. It is to be understood that the singular forms "a," "an," and "the" include plural references unless the context clearly dictates otherwise. The terms including technical and scientific terms used herein have the same meaning as commonly understood by one of ordinary skill in the art to which the embodiments herein pertain. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

According to an embodiment, a UE having communication functionality is able to recognize its location and generate location information based thereupon. The electronic device is, for example, a portable electronic device, wearable electronic device, mountable electronic device, or installable electronic device.

The portable electronic device may include at least one of a smartphone, a tablet PC, a mobile phone, a video phone, an electronic reader, a portable digital assistant (PDA), a portable media player (PMP), a motion pictures experts group audio layer 3 (MP3) player, a mobile medical electronic dictionary, an electronic key, a camcorder, a camera, and an electronic frame.

A wearable device may include at least one of an accessory-type device, such as a watch, ring, bracelet, anklet, necklace, glasses, contact lenses, swim goggles, or head-mounted device (HMD), a fabric- or clothes-integrated device, such as electronic clothes or sportswear, a body attaching-type device, such as a skin pad or tattoo, or a body implantable device, such as an implantable circuit.

The mountable electronic device may include at least one of a navigation, a laptop PC, and a netbook computer. The installable electronic device may include at least one of a desktop PC, a workstation, a medical device, a closed-circuit television (CCTV), and a security camera.

According to embodiments, examples of the electronic device may at least one of part of a piece of furniture or building/structure, an electronic board, an electronic signature receiving device, a projector, and various measurement devices for measuring water, electricity, gas, or electromagnetic waves, for example. The electronic device may be one or a combination of the foregoing devices, and may be a flexible electronic device, but are not limited to the foregoing devices and may include new electronic devices depending on the development of technology.

Various terms as used herein are defined as follows.

Domain channel: a channel between base station and UE in a full-dimension multi-antenna system using 2D planar array antennas.

First domain channel: a channel corresponding to first one of two domains when channels between base station and UE are represented as the two domains in a full-dimension multi-antenna system using 2D planar array antennas.

Second domain channel: a channel corresponding to second one of two domains when channels between base station and UE are represented as the two domains in a full-dimension multi-antenna system using 2D planar array antennas.

Joint rank indicator (JRI): a joint rank supportable for a UE to receive data and defined as a difference between the joint rank and (RI1 (first rank index)× RI2 (second rank index)).

First rank (RI1): a rank indicator of the first domain channel

Second rank (RI2): a rank indicator of the second domain channel.

Composite rank (CR): a rank represented as the product of RI1 (first rank) and RI2 (second rank).

Non-zero layer index (NLI): index information of a zero layer transmitted alongside layers including data information to remove inter-layer interference.

Correlation indicator (CI): number of eigen paths between domain channels. As an example, $CI_1$ and $CI_2$ are the numbers ($n_{p,1}$, $n_{p,2}$) of eigen paths of the first domain channel and the second domain channel and each is representable as one bit. That is, $CI_1$ and $CI_2$ being zeros indicates that $n_{p,1}$ and $n_{p,2}$ are greater than 1, and $CI_1$ and $CI_2$ being 1s indicates that $n_{p,1}$ and $n_{p,2}$ are 1s. This similarly applies to when $CI_1$ and $CI_2$ are represented in multiple bits.

In an embodiment, in a full-dimension multi-antenna system using 2D planar array antennas, a UE indicates an NLI to a base station based on feedback information in an explicit or implicit fashion. The term "explicit" indicates that the NLI may be contained in the feedback information that the UE provides to the base station, and the term "implicit" indicates that the UE may recognize the NLI based on information contained in the feedback information that the UE provides to the base station.

According to an embodiment, there is disclosed a scheme for transmitting, to a UE, data containing a zero layer using a precoder and a zero-layer mapper determined by feedback information that a base station receives from the UE in a full-dimension multi-antenna system using 2D planar array antennas.

According to another embodiment, there is disclosed a scheme for determining a precoder corresponding to each of multiple domain channels connecting a base station to a UE in a full-dimension multi-antenna system using 2D planar array antennas. As implementational examples related thereto, one of an explicit scheme in which the UE determines a precoder corresponding to each of the multiple domain channels and provides the precoder to the base station through the feedback information and an implicit scheme in which the base station determines a precoder corresponding to each of the multiple domain channels based on the feedback information received from the UE may be applied.

According to another embodiment, there is provided a scheme for adjusting the transmission period of reporting the PMI corresponding to each of the multiple domain channels from the UE to the base station in a full-dimension multi-antenna system using 2D planar array antennas.

Hereinafter, embodiments are described in detail with reference to the drawings. As used herein, the term "user" may denote a human or an artificial intelligent electronic device using the electronic device.

FIG. 1 illustrates configurations of a base station and a UE in a full-dimension multi-antenna system using 2D planar array antennas according to an embodiment.

Referring to FIG. 1, a base station 110 may transmit downlink data through a downlink 130 to a UE 120 and receive uplink data through an uplink from the UE 120. To that end, the base station 110 may include a first communication unit 112 and a first controller 114.

The first communication unit 112 may transmit data to at least one UE 120 through the downlink 130 and receive data through the uplink 140 from at least one UE 120. The first communication unit 112 may be transmitter (or transmitting unit), receiver (or receiving unit), transceiver, or communication interface. The first communication unit 112 may coupled with the first controller 114 or may controlled by the first controller 114.

The first communication unit 112 may transmit an RS to the UE 120 and receive feedback information as per the RS transmitted from the UE 120. The first communication unit 112 may transmit data containing a zero layer to the UE 120.

The first controller 114 may perform control as per the overall operation for transmission and reception of data through uplink and downlink with the at least one UE 120. The first controller 114 may includes at least one processor, such as a central processing unit (CPU), graphic processing unit (GPU), or application processor (AP).

The first controller 114 may determine whether to include the zero layer in the data to be transmitted using the feedback information provided by the UE 120, and as a result, may transmit data containing the basic layer only or data including the zero layer in the basic layer.

As an example, the first controller 114 may determine whether to include the zero layer in the data to be transmitted by the JRI contained in the feedback information. The JRI may indicate the JR calculated based on the PMIs estimated for each of multiple domain channels (a rank calculated based on the PMIs) or a difference between the JR and the CR (the rank calculated by the product of the RIs).

In this case, the first controller 114 would determine not to include the zero layer in the data to be transmitted if the JRI is 0 or equal to the CR. If the JRI is neither 0 nor equal to the CR, the first controller 114 would determine to include the zero layer in the data to be transmitted. When the JRI is 0 or is equal to the CR (hereinafter, a "first case"), this case corresponds to when the JR is equal to the CR. When the JRI is neither 0 nor is equal to the CR (hereinafter, a "second case"), the JRI may be a difference between the JR and the CR.

In the first case, the first controller 114 may abstain from performing zero-layer mapping. Unless zero-layer mapping is performed, the data to be transmitted does not contain the zero layer but would contain only the basic layer.

In the second case, the first controller 114 may perform zero-layer mapping, in which case the data to be transmitted would include the zero layer as well as the basic layer.

The operations for when zero-layer mapping is not performed may be identical to existing operations. Accordingly, the description below focuses primarily on the operations for when zero-layer mapping is performed.

The first controller 114 may determine a zero-layer mapper and a precoder based on feedback information, which may include, at least, a PMI and RI and JRI corresponding to each of the multiple domain channels connecting the UE 120. The feedback information may further include an NLI.

When the feedback information contains the NLI, the first controller 114 may determine a zero-layer mapper based on the NLI. The first controller 114 may determine a precoder using the PMIs contained in the feedback information, and may configure data including the zero layer using the determined zero-layer mapper, and the determined precoder and may transmit the configured zero layer-containing data through the first communication unit 112 to the UE 120.

Unless the feedback information contains the NLI, the first controller 114 may receive, through the first communication unit 112, an SRS transmitted by the UE 120, may estimate a downlink channel state using the received SRS, may determine the NLI using the PMIs and RIs and JRI corresponding to the multiple domain channels contained in the feedback information and the estimated channel state, may determine the zero-layer mapper based on the determined NLI, may determine a precoder using the PMIs contained in the feedback information, and may configure data including the zero layer using the determined zero-layer mapper, and the determined precoder and may transmit the configured zero layer-containing data through the first communication unit 112 to the UE 120.

The UE 120 may receive downlink data through the downlink 130 from the base station 110 and transmit uplink data through the uplink to the base station 110. To that end, the UE 120 may include a second communication unit 122 and a second controller 124.

The second communication unit 122 may receive an RS from the base station 110 and transmit feedback information as per the received reference signal to the base station 110. The second communication unit 122 may receive zero layer-containing data from the base station 110, may be a transmitter (or transmitting unit), receiver (or receiving unit), transceiver, or communication interface, and may be coupled with the second controller 124 or may be controlled by the second controller 124.

The second controller 124 may perform control as per the overall operation for transmission and reception of data through uplink and downlink with the base station 110, and may include at least one processor, such as a central processing unit (CPU), graphic processing unit (GPU), or application processor (AP).

According to an embodiment, the second controller 124 may receive an RS through each of the multiple domain channels from the base station 110 and estimate channel states corresponding to the multiple domain channels for the RSs received through the multiple domain channels. The second controller 124 may configure feedback information per domain channel based on the channel state estimated for each of the multiple domain channels. The feedback information may contain at least the PMI and RI and JRI corresponding to each of the multiple domain channels, and may further include an NLI which may become the index information of the zero layer to be transmitted by the base station 110 to remove inter-layer interference.

The second controller 124 may determine the JRI using the PMIs or using the RIs and the PMIs.

For example, the second controller 124 may calculate the JR based on the PMIs obtained corresponding to the multiple domain channels and determine the JR as the JRI.

As another example, the second controller 124 may calculate the JR based on the PMIs obtained corresponding to the multiple domain channels and calculate the CR by the product of the RIs obtained corresponding to the multiple domain channels. The second controller 124 may set the JRI as a result of comparing the calculated JR with the calculated CR, such as by setting the JRI as 0, e.g., if the JR and the CR are equal, and set the JRI as a difference between the JR and the CR if the JR and the CR are not equal. The second controller 124 may determine the NLI based on the JRI and PMIs and RIs obtained corresponding to the multiple domain channels.

Figure 2:
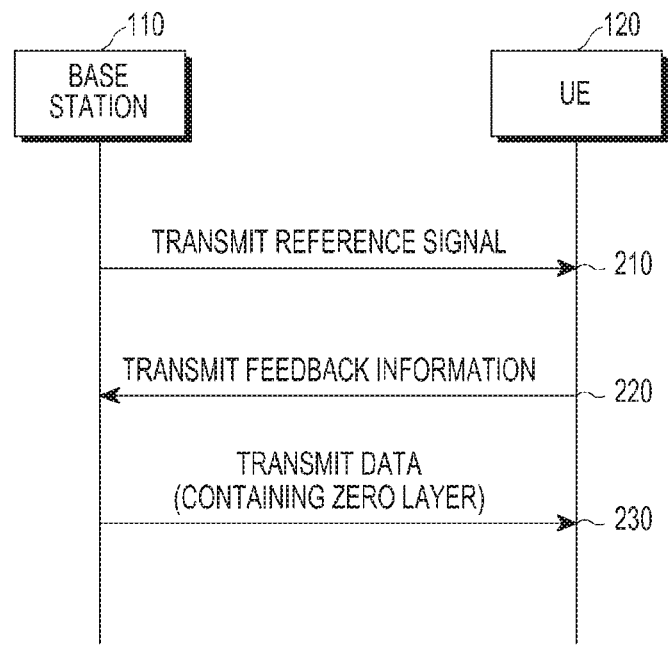
FIG. 2 illustrates a signal processing procedure between a base station and a UE in a full-dimension multi-antenna system using 2D planar array antennas according to an embodiment.

FIG. 2 illustrates a signal processing procedure between a base station and a UE in a full-dimension multi-antenna system using 2D planar array antennas according to an embodiment.

Referring to FIG. 2, a base station 110 may transmit reference signals to at least one UE 120 in step 210. The reference signal may become a CSI-RS, and may be transmitted through each of the multiple domain channels connecting the base station 110 to the UE 120, for example, to enable measurement of the CSI for each of the multiple domain channels.

The UE 120 may estimate the channel states corresponding to the multiple domain channels using the reference signal received through each of the multiple domain channels from the base station 110, and may configure feedback information per domain channel based on the channel state estimated for each of the multiple domain channels. The feedback information may contain the JRI, in which case the UE 120 may determine the JRI using the PMIs and RIs.

According to an embodiment, the UE 120 may calculate the JR based on the PMIs obtained corresponding to the multiple domain channels, calculate the CR by the product of the RIs obtained corresponding to the multiple domain channels, and set the JRI as a result of comparing the calculated JR with the calculated CR. The UE 120 may set the JRI as 0, e.g., if the JR and the CR are equal, and set the JRI as a difference between the JR and the CR if the JR and the CR are not equal.

According to an embodiment, the feedback information may further include the NLI, which may become the index information of the zero layer to be transmitted by the base station 110 to remove inter-layer interference. In this case, the UE 120 may determine the NLI based on the JRI and PMIs and RIs obtained corresponding to the multiple domain channels.

The feedback information may further include the PMIs and RIs and CI obtained corresponding to the multiple domain channels, as well as the JRI and/or NLI. The UE 120 may transmit the feedback information to the base station 110 in step 220.

The base station may receive the feedback information from the UE 120 and transmit data containing the zero layer to the UE 120 based on the received feedback information in step 230. The base station 110 may determine a zero-layer mapper and a precoder based on, e.g., the feedback information, configure zero layer-containing data using the determined precoder, and transmit the configured zero layer-containing data to the UE.

The base station 110 may determine whether to configure zero layer-containing data by the type of information contained in the feedback information and a scheme to configure the zero layer-containing data. For example, the base station 110 may determine whether to perform zero-layer mapping to configure zero layer-containing data by the JRI contained in the feedback information.

The base station 110 may determine whether to perform zero-layer mapping considering the JRI contained in the feedback information. The base station 110 may determine that it is not necessary to perform zero-layer mapping, e.g., when the JRI is 0 or is equal to the CR which corresponds to the product of the RIs. The base station 110 may determine that it is required to perform zero-layer mapping, e.g., when the JRI is neither 0 nor is equal to the CR which corresponds to the product of the RIs.

Upon determining that zero-layer mapping is required, the base station 110 may configure zero layer-containing data by performing zero-layer mapping to remove inter-layer interference.

For example, the zero-layer mapping may be conducted by Equation (1), as follows:

$$x_{layer}^0 = Z x_{layer} \quad (1)$$

where $x_{layer}$ is the basic layer signal, Z is the matrix for zero-layer mapping, and $x_{layer}^0$ is the layer signal where zero-layer mapping has been performed. As per Equation (1), the zero-layer mapping may be performed by the product of the basic layer signal $x_{layer}$ and the matrix Z for zero-layer mapping.

The matrix Z for zero-layer mapping may have a matrix dimension represented as $[N_{JRI} \times N_{CRI}]$, where $N_{JRI}$ may be defined as $(RI_1 \times RI_2)$, and $N_{CRI}$ may be defined as JRI or $(RI_1 \times RI_2 - JRI)$.

In the zero-layer matrix Z, the elements in the ith and jth rows may be represented as $z_{ij}$. The value of $z_{ij}$ may be the NLI corresponding to the ith row and the jth row, which may be 0 or 1. In this case, for the kth layer, $z_{ij}$ should meet the condition of Equation (2), as follows:

$$\sum_{i=(k-1)N_{JRI}+1}^{kN_{JRI}} \sum_{j=1}^{N_{JRI}} z_{ij} = 1 \quad (2)$$

As described, the base station 110 should be able to determine whether the value of $z_{ij}$ is 0 or 1 to perform zero-layer mapping. That is, the base station 110 should be able to obtain the NLI corresponding to the ith row and the jth row.

The base station 110 may obtain the NLI by one of an explicit scheme and an implicit scheme. In other words, as methods for obtaining the value of $z_{ij}$, there may be a method in which the UE explicitly indicates the value of $z_{ij}$ to the base station (explicit scheme), and a method in which the base station obtains $z_{ij}$ using the feedback information received from the UE (implicit scheme).

As per an embodiment of the implicit scheme, when the feedback information contains the JRI and PMIs and RIs corresponding to multiple domain channels, the base station 110 may receive an SRS from the UE 120 and perform channel estimation on the downlink by the received reference signal. The base station 110 may determine the NLI using the JRI and PMIs and RIs contained in the feedback information and the estimated downlink channel state.

The base station 110 may determine a zero-layer mapper based on the determined NLI, may determine a precoder using the PMIs contained in the feedback information, and may configure data including the zero layer using the determined zero-layer mapper, and the determined precoder and may transmit the configured zero layer-containing data to the UE 120.

As per an embodiment of the explicit scheme, when the feedback information contains the NLI, JRI, and PMIs and RIs corresponding to the multiple domain channels, the base station 110 may determine a zero-layer mapper based on the NLI contained in the feedback information from the UE 120, and may determine a precoder using the PMIs contained in the feedback information.

The base station 110 may configure data including the zero layer using the determined zero-layer mapper and the determined precoder and may transmit the configured zero layer-containing data to the UE 120.

Figure 3:
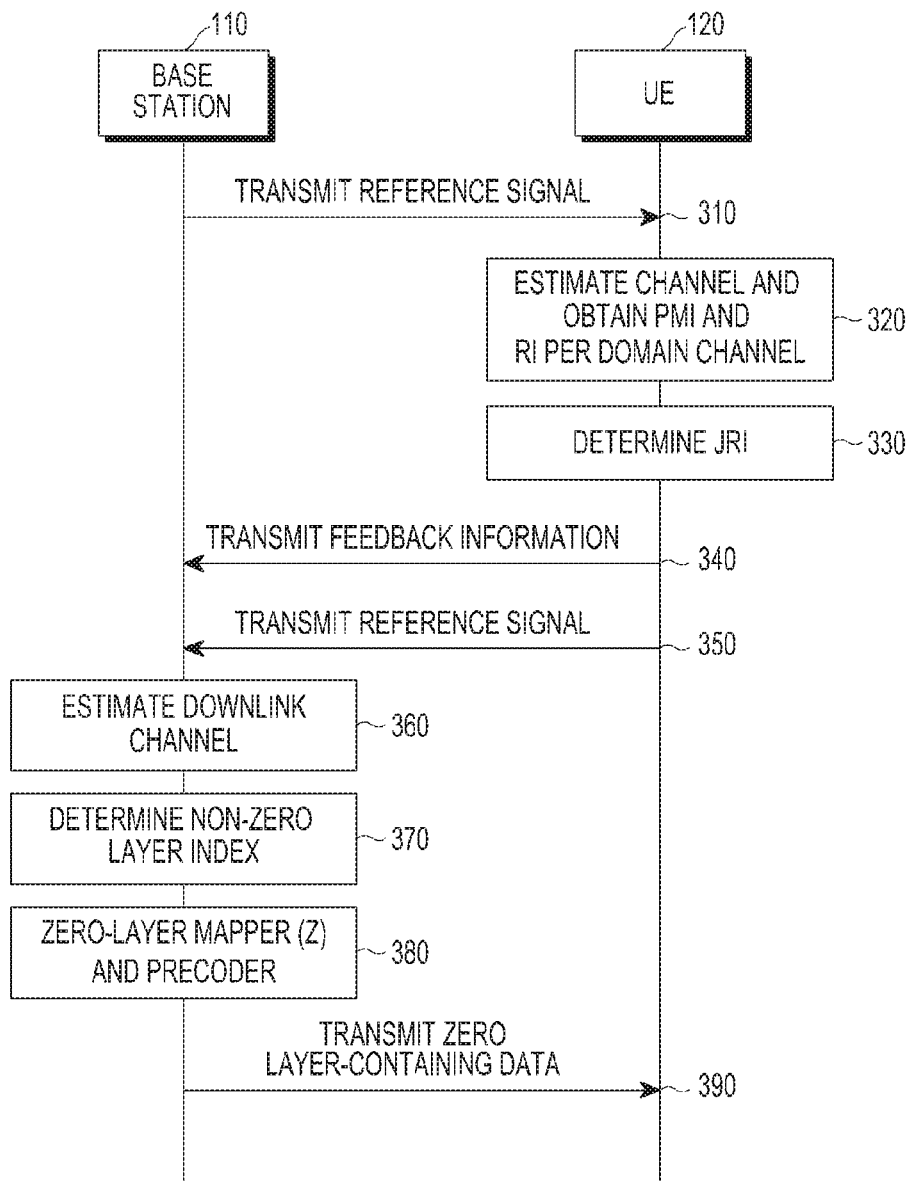
FIG. 3 illustrates a signal processing procedure for transmitting downlink data based on a zero-layer mapping by an implicit scheme in a full-dimension multi-antenna system using 2D planar array antennas according to an embodiment.

FIG. 3 illustrates a signal processing procedure for transmitting downlink data based on a zero-layer mapping by an implicit scheme in a full-dimension multi-antenna system using 2D planar array antennas according to an embodiment.

The signal processing procedure shown in FIG. 3 follows an embodiment for a base station to determine an NLI required to perform zero-layer mapping. By the signal processing procedure, the base station may determine an NLI using feedback information provided from the UE and perform zero-layer mapping using the determined NLI.

Referring to FIG. 3, a base station 110 may transmit reference signals to at least one UE 120 in step 310. The reference signal may become a CSI-RS which may be transmitted per domain channel connecting the base station 110 to the UE 120. When there are multiple domain channels, the CSI-RS may be transmitted through each of the multiple domain channels, to enable independent CSI measurement per domain channel.

The UE 120 may estimate the channel state of each domain channel by the reference signal received through the domain channel from the base station 110 and obtain a PMI and RI corresponding to the domain channel based on the channel state estimated per domain channel in step 320. As an example, when there are assumed to be two domain channels, a PMI and another obtained for the first and second domain channels may be $i_{1,1}$ and $i_{1,2}$, respectively, and an RI and another obtained for the first and second domain channels may be $RI_1$ and $RI_2$, respectively.

The UE 120 may determine a JRI using the PMIs obtained for the domain channels or the RIs and PMIs obtained for the domain channels. For example, the UE 120 may calculate a JR with the PMIs obtained for the domain channels and determine a JRI with the JR, or may calculate a JR with the PMIs obtained for the domain channels, calculate a CR with the RIs obtained for the domain channels, and determine a JRI with a difference between the calculated JR and the calculated CR. In this case, the UE 120 may set the JRI as 0, e.g., if the JR and the CR are equal, and set the JRI as a difference between the JR and the CR if the JR and the CR are not equal.

The UE 120 may configure feedback information containing the obtained PMIs and RIs and the JRI determined based on the PMIs and the RIs and transmit the configured feedback information to the base station 110 in step 340. As an example, under the assumption that there are two domain channels, the feedback information may contain $i_{1,1}$ and $i_{1,2}$, $RI_1$ and $RI_2$, and JRI.

The UE 120 may transmit a reference signal, such as an SRS, to the base station 110 in step 350. The reference signal may be subject to periodic or non-periodic transmission. The base station 120 and the UE 110 need to previously share information to determine the time of the periodic transmission or non-periodic transmission of the reference signal.

The base station 110 may receive the feedback information transmitted from the UE 120 in step 340, and may receive the reference signal, which may be an SRS, transmitted by the UE 120 in step 350. The base station 110 may perform channel estimation on downlink using the reference signal received from the UE 120, and may determine whether to perform channel estimation on downlink considering, e.g., whether data transmission by zero-layer mapping is required, using the JRI contained in the afore-received feedback information.

For example, when the JRI is 0 or is equal to the CR calculated by the product of the RIs, the base station 110 may determine that data transmission is possible without inter-layer interference even when zero-layer mapping is not performed. In this case, the base station 110 need not perform channel estimation on downlink using the reference signal received from the UE 120. Otherwise, when the JRI is neither 0 nor equal to the CR calculated by the product of the RIs, the base station 110 may determine that data transmission by zero-layer mapping is needed to remove inter-layer interference. In this case, the base station 110 should perform channel estimation on downlink using the reference signal received from the UE 120. The data transmission by zero-layer mapping denotes a series of operations to include a zero layer in the basic layer.

The base station 110 may determine the NLI based on the feedback information and the result of channel estimation on the downlink in step 370. The base station 110 may determine a zero-layer mapper (Z) based on the determined NLI and determine a precoder using the PMIs contained in the feedback information in step 380. The base station 110 may transmit layer signals where zero-layer mapping has been performed to the UE 120 using the determined zero-layer mapper and the determined precoder in step 390.

The operation of the base station 110 to determine the NLI based on the feedback information and the result of channel estimation on downlink (implicit scheme) and the operation of generating a layer signal where zero-layer mapping has been performed based thereupon have already been described.

Figure 4:
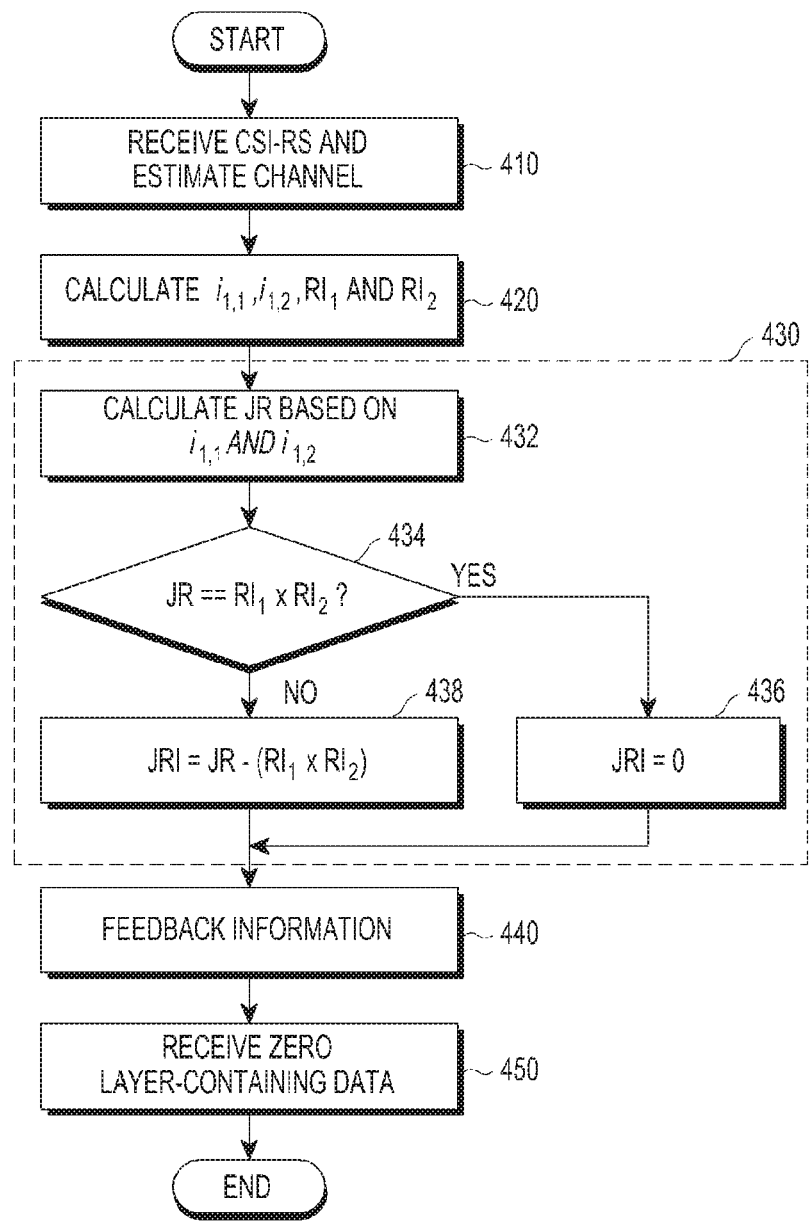
FIG. 4 illustrates control flows for a UE to provide feedback information to a base station to support an implicit scheme in a full-dimension multi-antenna system using 2D planar array antennas according to an embodiment.

FIG. 4 illustrates control flows for a UE to provide feedback information to a base station to support an implicit scheme in a full-dimension multi-antenna system using 2D planar array antennas according to an embodiment.

Referring to FIG. 4, the UE 120 may receive a CSI-RS through each domain channel from the base station 110 and estimate the channel state of the corresponding domain channel by the received reference signal in step 410. The CSI-RS may be transmitted per domain channel connecting the base station 110 to the UE 120. When there are multiple domain channels, the CSI-RS may be transmitted through each of the multiple domain channels to enable independent CSI measurement per domain channel.

The UE 120 may obtain a PMI and an RI corresponding to the domain channel based on the channel state estimated per domain channel in step 420.

The UE 120 determines a JRI using the PMI and RI obtained per domain channel in step 430. The UE 120 calculates a JR with, e.g., the PMIs obtained for the domain channels in step 432 and determines whether the calculated JR is equal or similar to a CR which may be defined as the product of the RIs obtained for the domain channels in step 434. Upon determining that the JR is identical or similar to the CR, the UE 120 may set the JRI as 0 in step 436. Upon determining that the JR is neither equal nor similar to the CR, the UE 120 may set the JRI as a difference between the JR and the CR in step 438.

The UE 120 may configure feedback information containing the PMIs and RIs obtained per domain channel and the JRI determined based on the PMIs and the RIs and transmit the configured feedback information to the base station 110 in step 440.

According to an embodiment, when there are assumed to be two domain channels, a PMI and another obtained for the first and second domain channels may be $i_{1,1}$ and $i_{1,2}$, respectively, and an RI and another obtained for the first and second domain channels may be $RI_1$ and $RI_2$, respectively. In this case, the UE 120 may calculate the JR based on $i_{1,1}$ and $i_{1,2}$ and determine whether the calculated JR is equal or similar to the CR calculated by the product of $RI_1$ and $RI_2$. Upon determining that the JR is equal or similar to the CR, the UE 120 may set the JRI as 0. Upon determining that the JR is not equal or similar to the CR, the UE 120 may subtract the CR value, which is calculated by the product of $RI_1$ and $RI_2$, from the JRI and set the resultant value as the JRI. The UE 120 may configure feedback information with $i_{1,1}$ and $i_{1,2}$, $RI_1$ and $RI_2$ and JRI and transmit the configured feedback information to the base station 110.

Figure 5:
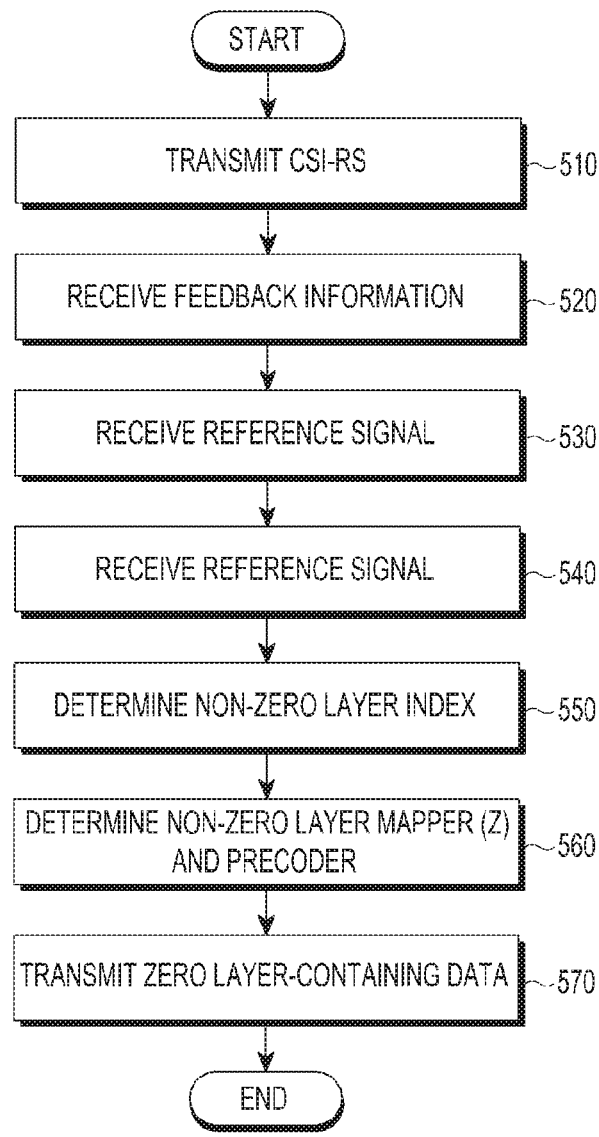
FIG. 5 illustrates control flows for a base station to transmit downlink data to support an implicit scheme in a full-dimension multi-antenna system using 2D planar array antennas according to an embodiment.

FIG. 5 illustrates control flows for a base station to transmit downlink data to support an implicit scheme in a full-dimension multi-antenna system using 2D planar array antennas according to an embodiment.

Referring to FIG. 5, a base station 110 may transmit CSI-RS s to at least one UE 120 in step 510, per domain channel connecting the base station 110 to the UE 120. When there are multiple domain channels, the CSI-RS may be transmitted through each of the multiple domain channels to enable independent CSI measurement per domain channel.

The base station 110 may receive the feedback information transmitted from the UE 120 in step 520. The feedback information may contain, e.g., PMIs and RIs obtained per domain channel and a JRI determined based thereupon. The base station 110 may receive the SRS transmitted by the UE 120 in step 530. The base station 110 may perform channel estimation on downlink using the reference signal received from the UE 120 in step 540. The base station 110 may determine whether to perform channel estimation on downlink considering, e.g., whether data transmission by zero-layer mapping is required, and may determine whether data transmission by zero-layer mapping is needed using the JRI contained in the afore-received feedback information.

For example, when the JRI is 0 or is equal to the CR calculated by the product of the RIs, the base station 110 may determine that data transmission is possible without inter-layer interference even when zero-layer mapping is not performed. In this case, the base station 110 need not perform channel estimation on downlink using the reference signal received from the UE 120. Otherwise, when the JRI is neither 0 nor equal to the CR calculated by the product of the RIs, the base station 110 may determine that data transmission by zero-layer mapping is needed to remove inter-layer interference, in which case the base station 110 should perform channel estimation on downlink using the reference signal received from the UE 120. The data transmission by zero-layer mapping denotes a series of operations to include a zero layer in the basic layer.

The base station 110 may determine the NLI based on the feedback information and the result of channel estimation on the downlink in step 550. The base station 110 may determine a zero-layer mapper (Z) based on the determined NLI and determine a precoder using the PMIs contained in the feedback information in step 560. The base station 110 may transmit layer signals where zero-layer mapping has been performed to the UE 120 using the determined zero-layer mapper and the determined precoder in step 570.

The operation of the base station 110 to determine the NLI based on the feedback information and the result of channel estimation on downlink (implicit scheme) and the operation of generating a layer signal where zero-layer mapping has been performed based thereupon have already been described.

Figure 6:
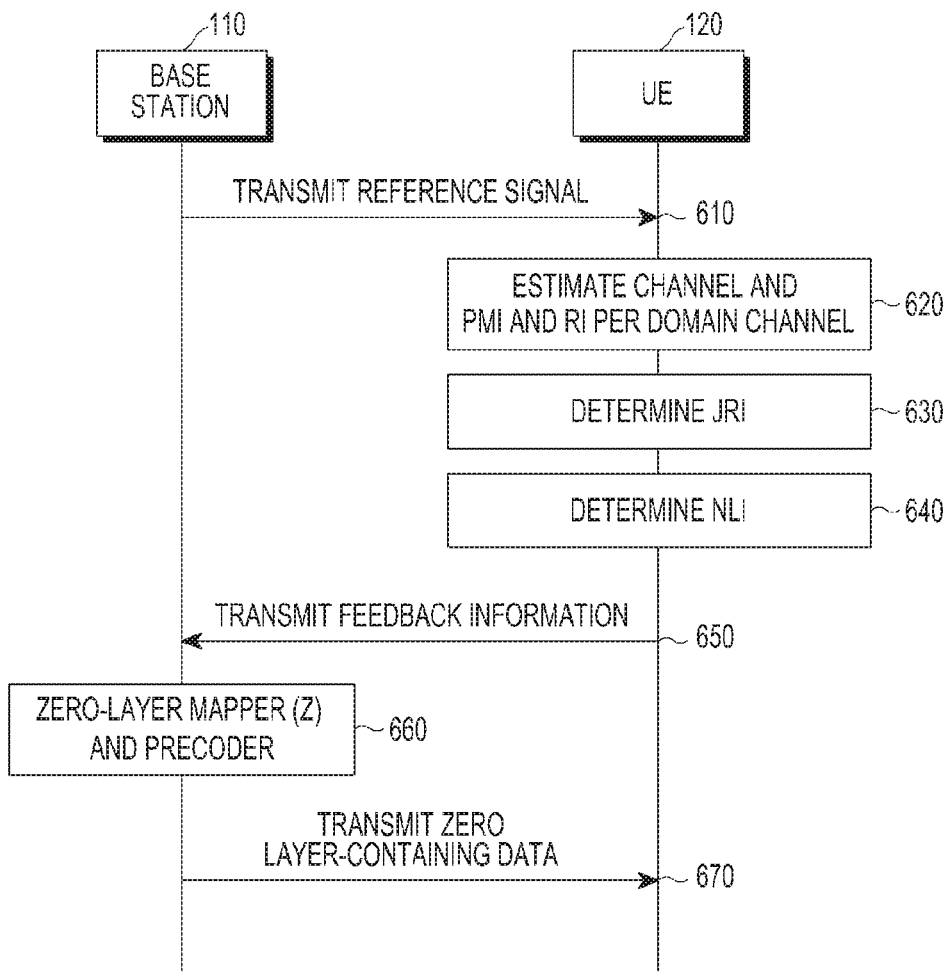
FIG. 6 illustrates a signal processing procedure for transmitting downlink data based on a zero-layer mapping by an explicit scheme in a full-dimension multi-antenna system using 2D planar array antennas according to an embodiment.

FIG. 6 illustrates a signal processing procedure for transmitting downlink data based on a zero-layer mapping by an explicit scheme in a full-dimension multi-antenna system using 2D planar array antennas according to an embodiment.

The signal processing procedure shown in FIG. 6 follows an embodiment for a UE to determine an NLI required to perform zero-layer mapping and feed the NLI back to a base station. By the signal processing procedure, the base station may perform zero-layer mapping using the NLI provided by the UE.

The signal processing procedure shown in FIG. 6 is identical to the signal processing procedure shown in FIG. 3 except that in FIG. 6, the UE that determines the NLI, and as the feedback information further contains the NLI, the base station needs to perform the operation of determining the NLI. Accordingly, no specific description of the procedure shown in FIG. 6 is presented.

Figure 7:
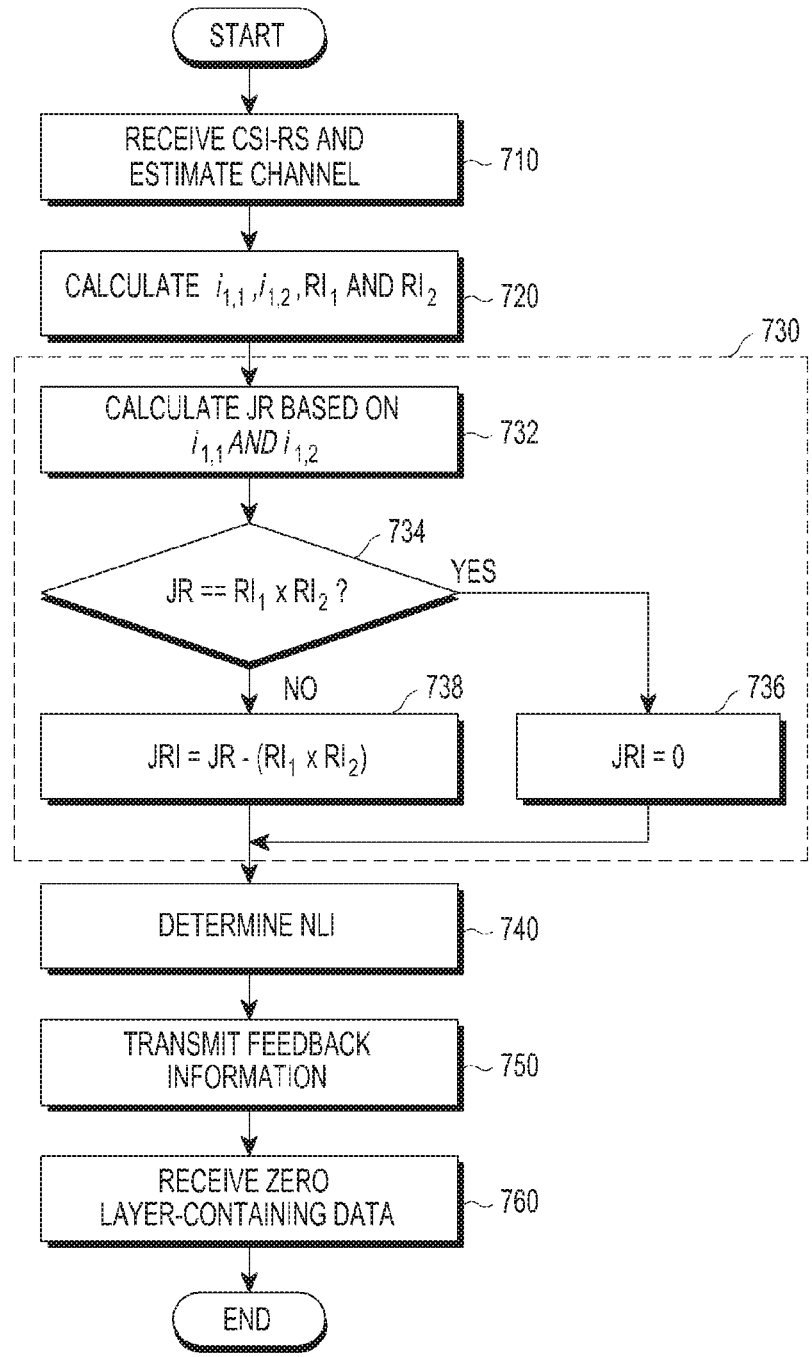
FIG. 7 illustrates control flows for a UE to provide feedback information to a base station to support an explicit scheme in a full-dimension multi-antenna system using 2D planar array antennas according to an embodiment.

FIG. 7 illustrates control flows for a UE to provide feedback information to a base station to support an explicit scheme in a full-dimension multi-antenna system using 2D planar array antennas according to an embodiment.

The control flows shown in FIG. 7 are similar to the control flows shown in FIG. 4 except for further performing step 740 in which the UE determines an NLI and enabling the feedback information transmitted to the base station to include the NLI. Thus, no detailed description of the operation of the UE as per the control flows shown in FIG. 7 is given below.

Figure 8:
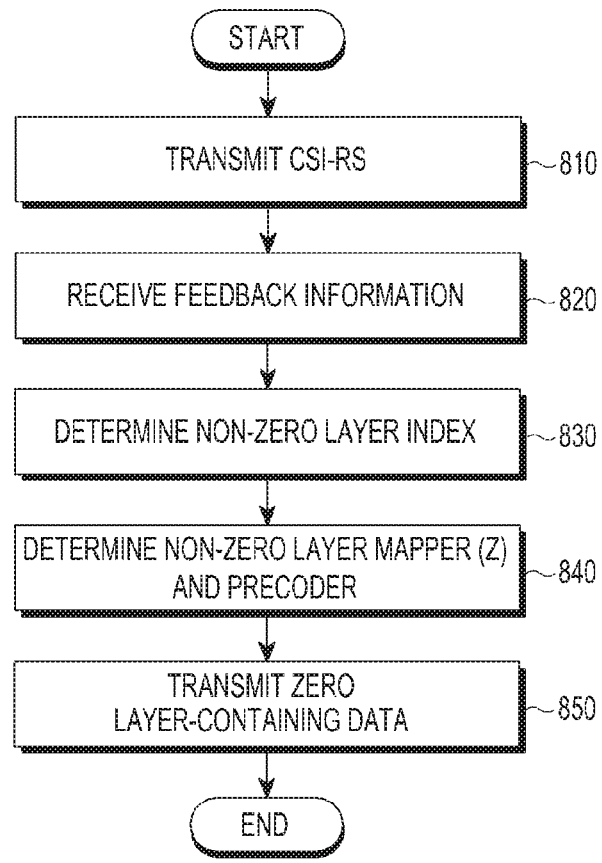
FIG. 8 illustrates control flows for a base station to transmit downlink data to support an explicit scheme in a full-dimension multi-antenna system using 2D planar array antennas according to an embodiment.

FIG. 8 illustrates control flows for a base station to transmit downlink data to support an explicit scheme in a full-dimension multi-antenna system using 2D planar array antennas according to an embodiment.

The control flows shown in FIG. 8 are similar to the control flows shown in FIG. 5 except for not requiring an operation for the base station to determine an NLI and obtaining an NLI through feedback information transmitted from the UE. Thus, no detailed description of the operation of the base station as per the control flows shown in FIG. 8 is given below.

Described are embodiments in which a UE provides feedback information to a base station, and the base station transmits, to the UE, downlink data based on zero-layer mapping based on the feedback information provided from the UE. However, the foregoing does not mention a scheme for a base station to determine a precoder considered to transmit data.

Generating Precoder

In a full-dimension multi-antenna system using 2D planar array antennas, a UE may feed information necessary to determine a precoder per domain channel back to a base station, which may generate a precoder per domain channel based on the information fed back by the UE.

The UE may choose a precoder preferable for each domain channel based on the channel state estimated per domain channel, determine a PMI indicating the chosen precoder, and feed the determined PMI back to the base station. In this case, the base station may generate a precoder per domain channel based on the PMI fed back by the UE.

According to an embodiment, the UE may determine a precoder corresponding to each of multiple domain channels based on the channel states estimated for the multiple domain channels, in which case the UE may select a codeword closest to either the determined precoder or the estimated channel and feed the selected codeword or information regarding the selected codeword back to the base station. A codeword index indicating the selected codeword may be used as the information regarding the selected codeword.

In this case, the base station may generate a precoder corresponding to each of the multiple domain channels using the codeword or information regarding the codeword fed back by the UE.

Alternatively, the UE may set information regarding matrices corresponding to the domain channels necessary for the base station to determine the precoders corresponding to the multiple domain channels based on the channel states estimated for the multiple domain channels and feed the set information about the matrices corresponding to the domain channels back to the base station. Assuming that there are two domain channels, the information regarding the matrices may be $A_1$ and $A_2$.

In this case, the base station may generate the precoder corresponding to each of the multiple domain channels using the information regarding the matrices fed back by the UE.

Of the two afore-described embodiments, the embodiment of feeding back the matrices corresponding to the domain channels mitigates a performance deterioration due to quantization on information necessary to generate precoders, enabling for relatively high frequency efficiency.

Prior to describing in detail a scheme for feeding back relevant information for generating precoders and a scheme for generating precoders based on the relevant information as disclosed herein, the technical background therefor is described.

In a full-dimension multi-antenna system using 2D planar array antennas according to an embodiment, the base station and the UE may use a precoder which is in the form of a combination of Equations (3), (4) and (5), as follows:

$$\varphi_n = e^{j\pi n/2} \tag{3}$$

$$u_m = \begin{bmatrix} 1 & e^{j\frac{2\pi n}{O_2 N_2}} & \cdots & e^{j\frac{2\pi n(N_1-1)}{O_2 N_2}} \end{bmatrix} \tag{4}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T \tag{5}$$

where $O_1$ is the parameter denoting the oversampling rate of the first codebook, and $O_2$ is the parameter denoting the oversampling rate of the second codebook. They may be set for the UE through higher-level signaling. m is the parameter denoting PMI information for the domain channel, and this parameter may be transmitted through $i_{1,1}$ (first PMI) to the base station. n is the parameter denoting PM information for the domain channel, and this parameter may be transmitted through $i_{1,2}$ (second PMI) to the base station. $N_1$ and $N_2$ are the parameters denoting the antenna setting and the size of codebook in the first and second dimensions, and these parameters may be set for the UE through higher-level signaling.

Table 1 below represents an example of a codebook configurable using the parameters where JR is 2, and the information transferred from the base station to the UEJ through higher-level signaling meets the following: Codebook_config=1.

TABLE 1

2 Layers, Codebook_config = 1
$i_{1,2} = 0, \ldots, N_2O_2 - 1$

| $i_{1,1}$ | $i_2$ | | | |
|---|---|---|---|---|
| | 0 | 1 | 2 | 3 |
| $0, \ldots, N_1O_1 - 1$ | $W_{i_{1,1},i_{1,1},i_{1,2},i_{1,2},0}^{(2)}$ | $W_{i_{1,1},i_{1,1},i_{1,2},i_{1,2},1}^{(2)}$ | $W_{i_{1,1},i_{1,1},i_{1,2},i_{1,2},2}^{(2)}$ | $W_{i_{1,1},i_{1,1},i_{1,2},i_{1,2},3}^{(2)}$ | where $W_{l,l',m,m',n}^{(2)} = \dfrac{1}{\sqrt{2P}} \begin{bmatrix} v_{l,m} & v_{l',m'} \\ \varphi_n v_{l,m} & \varphi_n v_{l,m} \end{bmatrix}$ In Table 1, $$\frac{1}{\sqrt{2P}}$$

is the parameter for normalization of transmit power, and $i_2$ is the information transmitted from the UE to the base station for beam selection.

The UE may transmit the PMI to the base station based on the information containing the indexes shown in Table 1. In this case, $i_{1,1}$ and $i_{1,2}$ may be fed back in separate pieces of information or in the form where ($i_{1,1}$, $i_{1,2}$) configures a pair and is joint-encoded.

As an example, when the JR between the base station and the UE is 2 or more, and the UE has $N_r$ receive antennas, the UE may recombine the channels as shown in Equations (6) and (7), as follows:

$$\tilde{H} = \left[ \sum_{i=1}^{N_{r2}} \sqrt{\lambda_{2,k}} u_{2,k,1} H_{1,k} \cdots \sum_{k=1}^{N_{r2}} \sqrt{\lambda_{2,k}} u_{2,k,N_2} H_{1,k} \right]^T = \tilde{U}\tilde{\Sigma}\tilde{V}^H \quad (6)$$

$$\bar{H} = \left[ \sum_{k=1}^{N_{r2}} \sqrt{\lambda_{1,k}} u_{1,k,1} H_{2,k} \cdots \sum_{k=1}^{N_{r2}} \sqrt{\lambda_{1,k}} u_{1,k,N_1} H_{2,k} \right]^T = \bar{U}\bar{\Sigma}\bar{V}^H \quad (7)$$

where $u_{1,k,a}$ and $u_{2,k,a}$ are the nth elements of the kth eigen paths of the first domain channel and the second domain channel, and $\lambda_{1,k}$ and $\lambda_{2,k}$ mean the channel gain of the kth eigen paths of the first domain channel and the second domain channel. $n_{p,1}$ and $n_{p,2}$ mean the number of the first domain channels and the number of the second domain channels, and $\overline{U\Sigma V^H}$ and $\widetilde{U\Sigma V^H}$, respectively, are the results obtained by performing singular value decomposition on and $\bar{H}$ and $\tilde{H}$. $x^H$ indicates a hermitian matrix for x.

The UE may calculate the PMI by Equation (6) or Equation (7).

According to an embodiment, when the UE calculates the PMI by Equation (6), the UE may calculate a precoder for the first domain channel by Equation (8), as follows:

$$F_1 = \bar{U}_{[1:N_r]} \quad (8)$$

where $\bar{U}_{[1:N_r]}$ may be a matrix having vector components from the first column vector of the matrix $\bar{U}$ to the $N_r$ th column vector.

In this case, the UE may calculate the precoder for the second domain channel in different manners given the relationship between $N_r$ and $N_2$.

When the relationship between $N_r$ and $N_2$ is $N_r^2 \leq N_2$, the UE may calculate the precoder for the second domain channel by Equation (9), as follows:

$$f_2 = (A_2^H A_2)^{-1} A_2^H b \quad (9)$$

where $A_2$ is a matrix obtained by recombining the vector components $\tilde{V}$ of Equation (4) as a subset, and b is the vector where only the first element is 1 while the other elements are 0's.

When the relationship between $N_r$ and $N_2$ is $N_r^2 > N_2$, the UE may calculate the precoder for the second domain channel by Equation (10), as follows:

$$f_{2,k} = (A_{2,k}^H A_{2,k}) A_{2,k}^H b_k \quad (10)$$

where k indicates the layer index, and $b_k$ indicates the vector where all the vector components, except that the vector component of the layer index when the non-zero layer is transmitted is 1, are 0's.

Table 2 below defines a first rank, a second rank, and a JR considering the relationship between $N_r$ and $N_2$ when the ranks are calculated using Equations (8) to (10).

TABLE 2

| | First rank | Second rank | Joint rank |
|---|---|---|---|
| $N_r^2 < N_2$ | $N_r$ | 1 | $N_r$ |
| $N_r^2 = N_2$ | | | |
| $N_r^2 > N_2$ | $N_r$ | $r_{r,2}$ | $N_r$ |

In Table 2, $r_{k,2}$ is greater than 1.

According to an embodiment, when the UE calculates the PMI by Equation (7), the UE may calculate a precoder for the second domain channel by Equation (11), as follows:

$$F_2 = \tilde{U}_{[1:N_r]} \quad (11)$$

where $\tilde{U}_{[1:N_r]}$ is a matrix having vector components from the first column vector of the matrix $\tilde{U}$ to the $N_r$ th column vector.

In this case, the UE may calculate the precoder for the first domain channel in different manners given the relationship between $N_r$ and $N_1$.

When the relationship between $N_r$ and $N_1$ is $N_r^2 \leq N_1$, the UE may calculate the precoder for the first domain channel by Equation (12), as follows:

$$f_1 = (A_1^H A_1)^{-1} A_1^H b \quad (12)$$

where $A_1$ is a matrix obtained by recombining the vector components of $\bar{V}$ in Equation (5) as a subset, and b is the vector whose element is 0 or 1. As an example, where $N_1=4$, and $N_2=4$, b may be represented as [1000010000100001].

When the relationship between $N_r$ and $N_1$ is $N_r^2 > N_1$, the UE may calculate the precoder for the first domain channel by Equation (13), as follows;

$$f_{l,k} = (A_{l,k}^H A_{l,k}) A_{l,k}^H b_k \quad (13)$$

where k indicates the layer index, and $b_k$ indicates the vector where all the vector components, except that the vector component of the layer index when the non-zero layer is transmitted is 1, are 0's.

Table 3 below defines a first rank, a second rank, and a JR considering the relationship between $N_r$ and $N_1$ when the ranks are calculated using Equations (11) to (13).

TABLE 3

|  | First rank | Second rank | Joint rank |
|---|---|---|---|
| $N_r^2 < N_1$ | 1 | $N_r$ | $N_r$ |
| $N_r^2 = N_1$ |  |  |  |
| $N_r^2 > N_1$ | $r_{f,1}$ | $N_r$ | $N_r$ |

In Table 3, $r_{f,1}$ is greater than 1.

As seen in Tables 2 and 3, in the case $N_r^2 > N_2$ upon estimating the PMI by Equation (6) and in the case $N_r^2 > N_1$ upon estimating the PMI by Equation (7), the CR, which is the product of the first rank and the second rank, may be inconsistent with the JR. To address this, an embodiment teaches that the UE feeds the JRI back to the base station.

When the CR, the product of the first rank and the second rank, is inconsistent with the JR, if the base station transmits as much layer signal as the JR to the UE, inter-layer interference may occur, deteriorating the reception performance of layer signals. To resolve this, according to an embodiment, the base station includes a zero layer in the layer signal and transmits the layer signal.

Now described are embodiments for the base station to generate a precoder for each of multiple domain channels based on information fed back by the UE, i.e., feedback information based on the above-described technical background. Embodiments for determining a precoder are proposed herein given the type of information fed back to the base station by the UE to determine a precoder.

Figure 9:
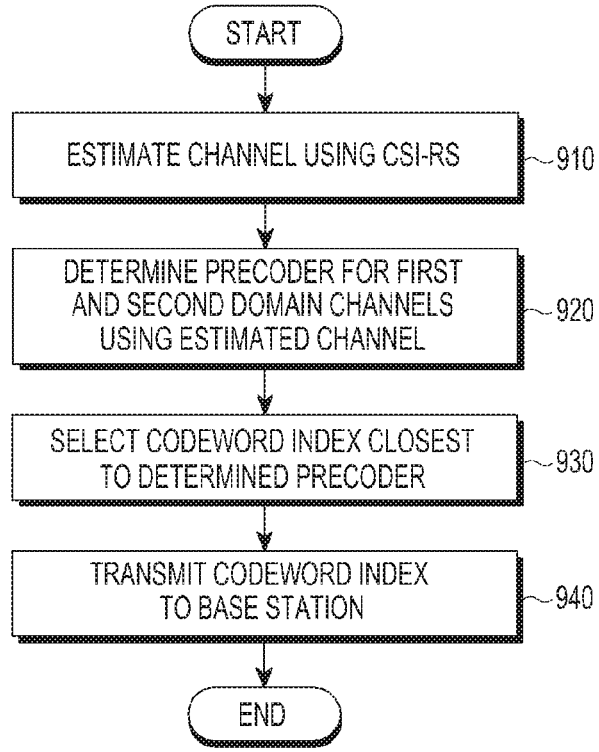
FIG. 9 illustrates control flows for a UE to explicitly feedback relevant information to determine a precoder by a base station in a full-dimension multi-antenna system using 2D planar array antennas according to an embodiment.

FIG. 9 illustrates control flows for a UE to explicitly feedback relevant information to determine a precoder by a base station in a full-dimension multi-antenna system using 2D planar array antennas according to an embodiment. In this case, the relevant information may be precoder-related information.

In FIG. 9, the UE may determine a precoder for each of multiple domain channels, select a codeword closest to the determined precoder, and feed, back to the base station, the selected codeword or information regarding the selected codeword (relevant information). As an example, the UE may determine a precoder for each of multiple domain channels, and select a codeword located closest to a location of the determined precoder.

Referring to FIG. 9, the UE 120 may receive a CSI-RS, which is a reference signal, through each domain channel from the base station 110 and estimate the channel state of the corresponding domain channel using the received CSI-RS in step 910. The CSI-RS may be transmitted per domain channel connecting the base station 110 to the UE 120, per full port or partial port. When there are multiple domain channels, the CSI-RS may be transmitted through each of the multiple domain channels to enable a CSI independent for each domain channel to be measured.

The UE 120 may determine precoders for a first domain channel and a second domain channel based on the channel states estimated per domain channel in step 920. Determining the precoders is the same as what has been described in connection with the technical background. Accordingly, no detailed description thereof is given.

The UE 120 may select a codeword index closest to the precoder determined per domain channel in step 930. The UE 120 may transmit the selected codeword index through the PMI to the base station 110 in step 940.

Figure 10:
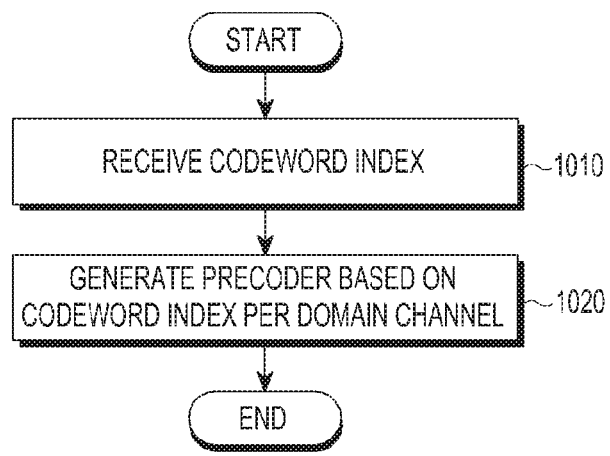
FIG. 10 illustrates control flows for a base station to generate a precoder based on explicit relevant information fed back by a UE to determine a precoder in a full-dimension multi-antenna system using 2D planar array antennas according to an embodiment.

FIG. 10 illustrates control flows for a base station to generate a precoder based on explicit relevant information fed back by a UE to determine a precoder in a full-dimension multi-antenna system using 2D planar array antennas according to an embodiment.

As per the control flows of FIG. 10, the base station may receive the codeword index corresponding to each of the multiple domain channels from the UE and generate the codeword for each domain channel based thereupon.

Referring to FIG. 10, the base station 110 may receive feedback for the codeword index determined per domain channel from the UE 120 in step 1010. The base station 110 may generate a precoder to precode data to be transmitted through the corresponding domain channel based on the codeword index fed back per domain channel in step 1020.

Figure 11:
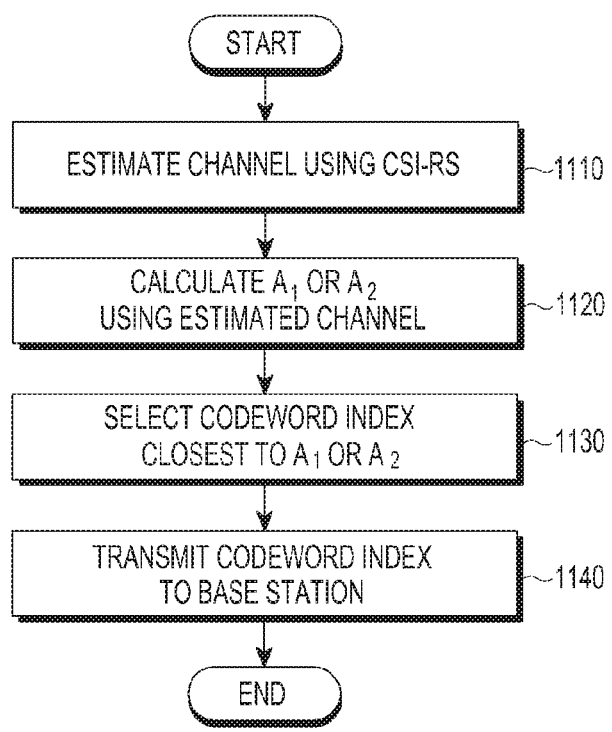
FIG. 11 illustrates control flows for a UE to implicitly feedback relevant information to determine a precoder by a base station in a full-dimension multi-antenna system using 2D planar array antennas according to an embodiment.

FIG. 11 illustrates control flows for a UE to implicitly feedback relevant information to determine a precoder by a base station in a full-dimension multi-antenna system using 2D planar array antennas according to an embodiment.

In FIG. 11, the UE may feed, back to the base station, information regarding matrices corresponding to the domain channels necessary for the base station to determine the precoder corresponding to each of the multiple domain channels based on the channel state estimated for each of the multiple domain channels.

Referring to FIG. 11, the UE 120 may receive a CSI-RS, which is a reference signal, through each domain channel from the base station 110 and estimate the channel state of the corresponding domain channel using the received CSI-RS in step 1110. The CSI-RS may be transmitted per domain channel connecting the base station 110 to the UE 120, for all or some ports. When there are multiple domain channels, the CSI-RS may be transmitted through each of the multiple domain channels to enable a CSI independent for each domain channel to be measured.

The UE 120 may obtain the information regarding the matrices corresponding to the domain channels based on the channel state estimated per domain channel. As an example, in step 1120, assuming that there are two domain channels, $A_1$ and $A_2$, which are information regarding the matrices, may be calculated based on the channel states estimated for the first and second domain channels.

The UE 120 may select the codeword index closest to the obtained $A_1$ and $A_2$, i.e., the codeword index closest to the obtained $A_1$ or $A_2$ in step 1130. The UE 120 may transmit the selected codeword index through the PMI to the base station 110 in step 1140. The selected codeword index may be transmitted through other signaling than the PMI.

Figure 12:
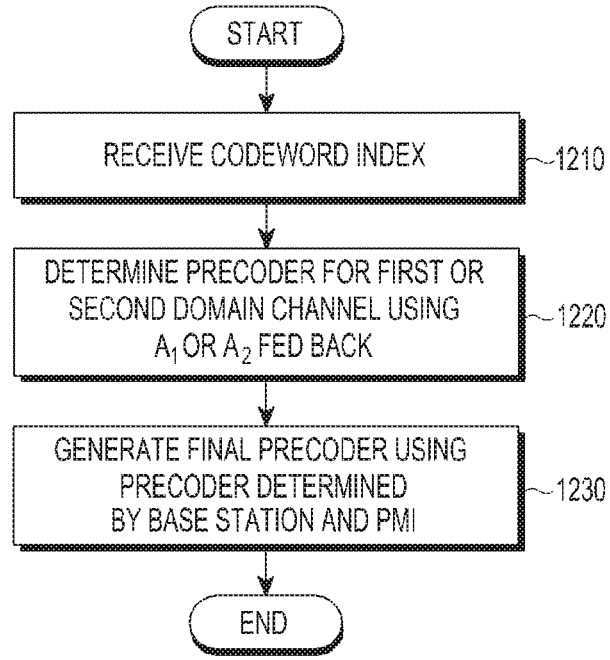
FIG. 12 illustrates control flows for a base station to generate a precoder based on implicit relevant information fed back by a UE to determine a precoder in a full-dimension multi-antenna system using 2D planar array antennas according to an embodiment.

FIG. 12 illustrates control flows for a base station to generate a precoder based on implicit relevant information fed back by a UE to determine a precoder in a full-dimension multi-antenna system using 2D planar array antennas according to an embodiment.

In FIG. 12, the base station may receive the codeword index corresponding to each of the multiple domain channels from the UE and generate the codeword for each domain channel based thereupon.

Referring to FIG. 12, the base station 110 may receive feedback for the codeword index determined per domain channel from the UE 120 in step 1210. The base station 110 may determine the precoder for the first or second domain channels using $A_1$ and $A_2$ corresponding to the codeword index fed back per domain channel in step 1220. The precoder for the first domain channel may be determined by Equations (12) or (13), considering, e.g., the relationship between and $N_r$ and $N_1$. The precoder for the second domain channel may be determined by Equations (9) or (10), considering, e.g., the relationship between $N_r$ and $N_1$.

The base station 110 may compose the precoder received from the PMI fed back by the UE 120 with the determined precoder, generating a final precoder to precode the data to be transmitted through the corresponding domain channel in step 1230.

Adjusting PMI Transmission Cycle

Disclosed below is a scheme for adjusting the transmission cycle of PMI in a full-dimension multi-antenna system using 2D planar array antennas according to an embodiment.

As an example, the base station and the UE may be connected via two domain channels in which case the JR of the channels is assumed to be 1. Under the foregoing assumption, the channel h may be defined by Equation (14) or Equation (15), as follows:

$$h = \sum_{k=1}^{r_2} \left[ \sqrt{\lambda_{2,k}} \, h_{1,k,1} u_{2,k} \ \sqrt{\lambda_{2,k}} \, h_{1,k,2} u_{2,k} \ \cdots \ \sqrt{\lambda_{2,k}} \, h_{1,k,N_1} u_{2,k} \right] \quad (14)$$

where $u_{2,k}$ indicates the kth eigen path of the second domain channel, $h_{l,k,n}$ indicates the channel gain from the nth antenna port of the first domain channel, and $r_2$ indicates the number of eigen paths of the second domain channel $$h = \sum_{k=1}^{r_1} \left[ \sqrt{\lambda_{1,k}} \, h_{2,k,1} u_{1,k} \ \sqrt{\lambda_{1,k}} \, h_{2,k,2} u_{1,k} \ \cdots \ \sqrt{\lambda_{1,k}} \, h_{2,k,N_2} u_{1,k} \right] \quad (15)$$

where $u_{1,k}$ indicates the kth eigen path of the first domain channel, $h_{2,k,n}$ indicates the channel gain from the nth antenna port of the second domain channel, and $r_1$ indicates the number of eigen paths of the first domain channel.

The channel h defined in Equation (14) may be a channel defined based on the eigen path of the second domain channel, and the channel defined by Equation (15) may be a channel defined based on the eigen path of the first domain channel.

Equations (14) and (15) may be similar to each other as per their mathematical definitions. However, in terms of real implementations, the channels of Equations (14) and (15) may differ from each other. Accordingly, a preferred one of the channels as per Equations (14) and (15) may be available to generate channel information. As an example, the preferred channel may be closer to the real channel.

The first and second domain channels may be represented as Equations (16) and (17), as follows, using Equations (14) and (15), respectively.

$$\tilde{H} = \begin{bmatrix} | & & | \\ h^*_{1,1} & \cdots & h^*_{1,r_2} \\ | & & | \end{bmatrix} \begin{bmatrix} \sqrt{\lambda_{2,1}} & & \\ & \ddots & \\ & & \sqrt{\lambda_{2,r_2}} \end{bmatrix} \begin{bmatrix} - & u^H_{2,1} & - \\ & \vdots & \\ - & u^H_{2,r_2} & - \end{bmatrix} \quad (16)$$

where $h_{1,k}$ may be defined as $[h_{1,k,1} \ h_{1,k,2} \ \cdots \ h_{1,k,N_1}]$, and x* indicates the complex conjugate of X.

$$\overline{H} = \begin{bmatrix} | & & | \\ h^*_{2,1} & \cdots & h^*_{2,r_1} \\ | & & | \end{bmatrix} \begin{bmatrix} \sqrt{\lambda_{1,1}} & & \\ & \ddots & \\ & & \sqrt{\lambda_{1,r_1}} \end{bmatrix} \begin{bmatrix} - & u^H_{1,1} & - \\ & \vdots & \\ - & u^H_{1,r_1} & - \end{bmatrix} \quad (17)$$

where $h_{2,k}$ may be defined as $[h_{2,k,1} \ h_{2,k,2} \ \cdots \ h_{2,k,N_2}]$, and x* indicates the complex conjugate of X.

In this case, the UE may determine a first PMI and a second PMI using Equations (16) and (17).

For example, when the rank is 1, the UE may determine the first PMI ($i_{1,1}$) and the second PMI ($i_{1,2}$) by Equation (18), as follows:

$$(i_{1,1}, i_{1,2}) = \arg\max_{(k_1,k_2)} \ \max \left( |v_{k_1,1} \tilde{H} w_{k_2,1}|^2, \ |w_{k_2,1} \overline{H} v_{k_1,1}|^2 \right) \quad (18)$$

Where $r_2$ is 1 in Equation (18), Equation (18) may be used interchangeably with Equation (19), as follows:

$$(i_{1,1}, i_{1,2}) = \quad (19)$$
$$\arg\max_{(k_1,k_2)} \ \max \left( |h^H_{1,1} v_{k_1,1}|^2 \ |\sqrt{\lambda_{2,1}} \, u^H_{2,1} w_{k_2,1}|^2, \ |w_{k_2,1} \overline{H} v_{k_1,1}|^2 \right)$$

Where $r_1$ is 1 in Equation (18), Equation (18) may be used interchangeably with Equation (20), as follows:

$$(i_{1,1}, i_{1,2}) = \quad (20)$$
$$\arg\max_{(k_1,k_2)} \ \max \left( |v_{k_1,1} \tilde{H} w_{k_2,1}|^2, \ |h^H_{2,1} w_{k_2,1}|^2 \ |\sqrt{\lambda_{1,1}} \, u^H_{1,1} v_{k_1,1}|^2 \right)$$

When in Equation (19) $i_{1,1}$ and $i_{1,2}$ each are selected based on $|h_{1,1}{}^H v_{k_1,1}|^2 |\sqrt{\lambda_{2,1}} u_{2,1}{}^H w_{k_2,1}|^2$, $i_{1,2}$ may not influence the performance although transmitted is performed in a relatively long period as compared with $i_{1,1}$. When in Equation (20) $i_{1,1}$ and $i_{1,2}$ each are selected based on $|h_{2,1}{}^H v_{k_2,1}|^2 |\sqrt{\lambda_{1,1}} u_{1,1}{}^H v_{k_1,1}|^2$, $i_{1,1}$ may not influence the performance although transmitted is performed in a relatively long period as compared with $i_{1,2}$.

A scheme for adjusting the transmission cycle of the first and second PMIs as per the eigen paths of the first and second domain channels is taught herein given what has been set forth. Specifically, there is disclosed a scheme for including a correlation indicator $CI_1$ of the first domain channel and a correlation indicator $CI_2$ of the second domain channel in feedback information that the UE sends to the base station to adjust the transmission cycle of and $i_{1,1}$ $i_{1,2}$.

According to an embodiment, the UE may include $CI_1$ and $CI_2$ in the feedback information to implicitly transfer eigen path coefficient information of the first domain channel and eigen path coefficient information of the second domain channel to the base station.

The base station may determine whether to use the precoder to precode the reference signal considering $CI_1$ and $CI_2$ contained in the feedback information and the PMI to be used to generate the precoder upon using the precoder for reference signal. The base station may determine one of the first PMI corresponding to the first domain channel and the second PMI corresponding to the second domain channel. When one PMI is determined, the base station may precode the reference signal using the determined PMI and transmit the precoded reference signal to the UE.

The UE may receive the precoded reference signal, obtain at least one PMI ($i_{1,1}$ or $i_{1,2}$ or $i_{1,1}$ and $i_{1,2}$) by channel estimation on at least one of the first domain channel and the second domain channel by the received precoded reference signal, and feed the at least one PMI obtained back to the base station.

Table 4 below represents an example in which different per-domain channel PMI transmission cycles are applied based on $CI_1$ and $CI_2$ contained in the feedback information.

TABLE 4

| $CI_1$ | $CI_2$ | Operation of base station | Operation of UE |
|---|---|---|---|
| 1 | 0 | transmission of non-precoded CSI-RS | $i_{1,1}$, $i_{1,2}$ transmission |
| 1 | 0 | Transmission of precoded CSI-RS by first PMI | $i_{1,2}$ transmission |
| 0 | 1 | Transmission of precoded CSI-RS by second PMI | $i_{1,1}$ transmission |
| 1 | 1 | Reserved | |

For example, when $CI_1$ and $CI_2$ contained in the feedback information are 0s, the base station may perform normal reference signal transmission operations as previously described. The normal reference signal transmission operations may transmit the CSI-RS without precoding, in which case the UE may perform channel estimation using the CSI-RS received from the base station, which has not been precoded. The UE may feed $i_{1,1}$, which is the first PMI by the channel estimation, and $i_{1,2}$, which is the second PMI, back to the base station.

For example, when $CI_1$ contained in the feedback information is 1, and $CI_2$ is 0, the base station may generate a first PMI-based precoder for transmitting the reference signal. The base station may precode the CSI-RS using the generated precoder, and may transmit, to the UE, the reference signal precoded using the precoder generated based on the first PMI. In this case, the UE may perform channel estimation using the precoded reference signal (the CSI-RS precoded using the first PMI-based precoder) received from the base station. The UE may feed back to the base station $i_{1,2}$ which is the second PMI determined by channel estimation. In this case, the UE does not feed back to the base station $i_{1,1}$ which is the first PMI.

For example, when $CI_1$ contained in the feedback information is 0, and $CI_2$ is 1, the base station may generate a second PMI-based precoder for the purpose of transmitting the reference signal, may precode the CSI-RS using the generated precoder, and may transmit, to the UE, the reference signal precoded using the precoder generated based on the second PMI. In this case, the UE may perform channel estimation using the precoded reference signal (the CSI-RS precoded using the second PMI-based precoder) received from the base station. The UE may feed back to the base station $i_{1,1}$ which is the first PMI determined by channel estimation. In this case, the UE does not feed back to the base station $i_{1,2}$ which is the second PMI.

Figure 13:
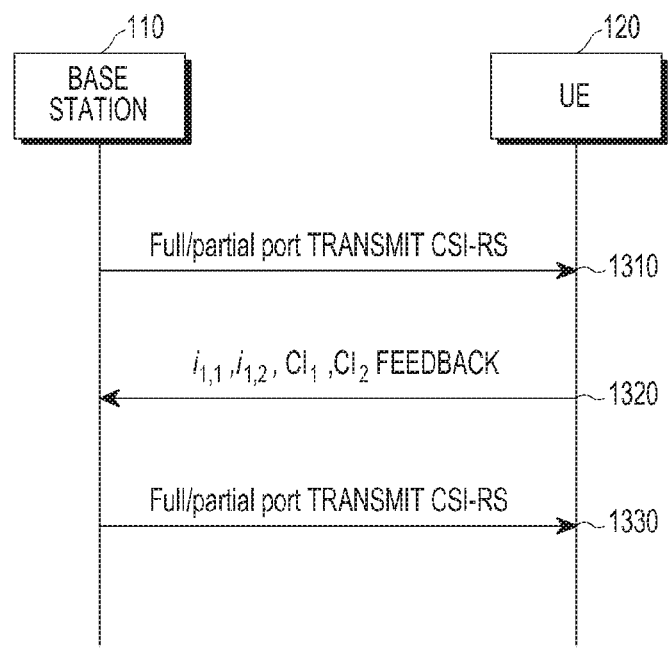
FIG. 13 illustrates a signal processing procedure for when both $CI_1$ and $CI_2$ contained in feedback information are zeros in a full-dimension multi-antenna system using 2D planar array antennas according to an embodiment.

FIG. 13 illustrates a signal processing procedure for when both $CI_1$ and $CI_2$ contained in feedback information are zeros in a full-dimension multi-antenna system using 2D planar array antennas according to an embodiment. The signal processing procedure of FIG. 13 assumes that the base station 110 and the UE 120 are connected via a first domain channel and a second domain channel.

Referring to FIG. 13, the base station 110 may perform full-port or partial-port transmission of the reference signal, CSI-RS, to the UE 120 in step 1310. The term "full-port" denotes all of the communication ports provided in the base station 110 for signal transmission, and the term "partial-port" denotes some of the communication ports provided in the base station 110 for signal transmission.

The UE 120 may receive the reference signal full-port or partial-port transmitted by the base station 110 and estimate the respective channel states for the first and second domain channels based on the received reference signal. The UE 120 may determine $i_{1,1}$ and $i_{1,2}$, which are the PMIs corresponding to the first and second domain channels based on the channel states estimated for the first and second domain channels. The UE 120 may feed back to the base station 110 $i_{1,1}$, $i_{1,2}$, the number ($CI_1$) of eigen paths of the first domain channel, and the number ($CI_2$) of eigen paths of the second domain channel in step 1320. According to the assumption, $CI_1$ and $CI_2$ fed back to the base station 110 may both be 0's, which indicates that there are multiple eigen paths for a corresponding domain channel.

When $CI_1$ and $CI_2$ fed back from the UE 120 are 0's, the base station 110 transmits through full-port or partial-port transmission in the subsequent transmission period of reference signal in step 1330.

Figure 14:
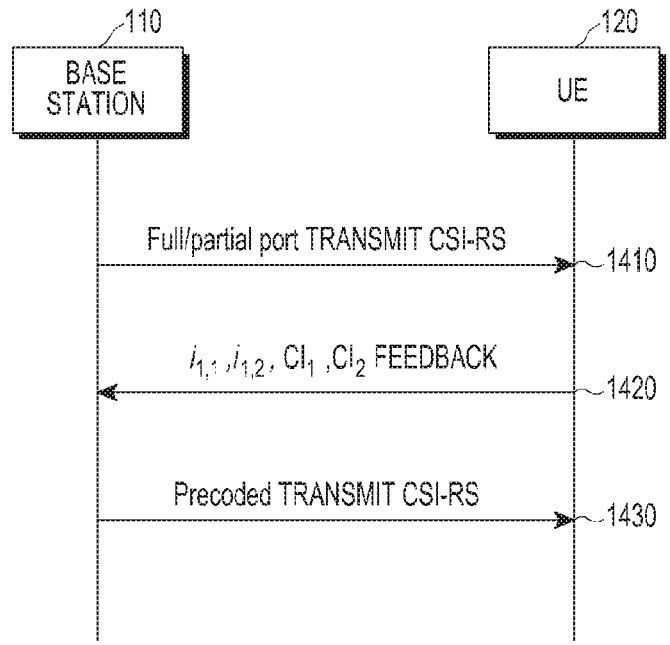
FIG. 14 illustrates a signal processing procedure for when either $CI_1$ or $CI_2$ contained in feedback information is zero in a full-dimension multi-antenna system using 2D planar array antennas according to an embodiment.

FIG. 14 illustrates a signal processing procedure for when either $CI_1$ or $CI_2$ contained in feedback information is zero in a full-dimension multi-antenna system using 2D planar array antennas according to an embodiment. The signal processing procedure of FIG. 14 assumes that the base station 110 and the UE 120 are connected via a first domain channel and a second domain channel.

Referring to FIG. 14, the base station 110 may perform full-port or partial-port transmission of the reference signal, CSI-RS, to the UE 120 in step 1410. The expression "full-port" denotes all of the communication ports provided in the base station 110 for signal transmission, and the expression "partial-port" denotes some of the communication ports provided in the base station 110 for signal transmission.

The UE 120 may receive the reference signal full-port or partial-port transmitted by the base station 110 and estimate the respective channel states for the first and second domain channels based on the received reference signal. The UE 120 may determine $i_{1,1}$ and $i_{1,2}$, which are the PMIs corresponding to the first and second domain channels based on the channel states estimated for the first and second domain channels. The UE 120 may feed back to the base station 110 $i_{1,1}$, $i_{1,2}$, the number ($CI_1$) of eigen paths of the first domain channel, and the number ($CI_2$) of eigen paths of the second domain channel in step 1420. According to the foregoing, one of $CI_1$ and $CI_2$ fed back to the base station 110 may be 1, and the other may be 0, indicating that there are multiple eigen paths for a corresponding domain channel, and CI being 1 denotes that there is one eigen path for a corresponding domain channel.

When one of $CI_1$ and $CI_2$ fed back from the UE 120 is 1, the base station 110 may generate the precoder using $i_{1,1}$ or $i_{1,2}$ in the subsequent transmission period of reference signal. The base station 110 may precode the CSI-RS, which is the reference signal, using the generated precoder and transmit the precoded CSI-RS to the UE 120 in step 1430.

For example, when $CI_1$ is 1, and $CI_2$ is 0, the base station 110 generates the precoder using $i_{1,1}$, precodes the CSI-RS, which is the reference signal, using the generated precoder, and transmit the precoded CSI-RS to the UE 120. For example, when $CI_1$ is 0, and $CI_2$ is 1, the base station 110 generates the precoder using $i_{1,2}$, precodes the CSI-RS, which is the reference signal, using the generated precoder, and transmit the precoded CSI-RS to the UE 120.

Figure 15:
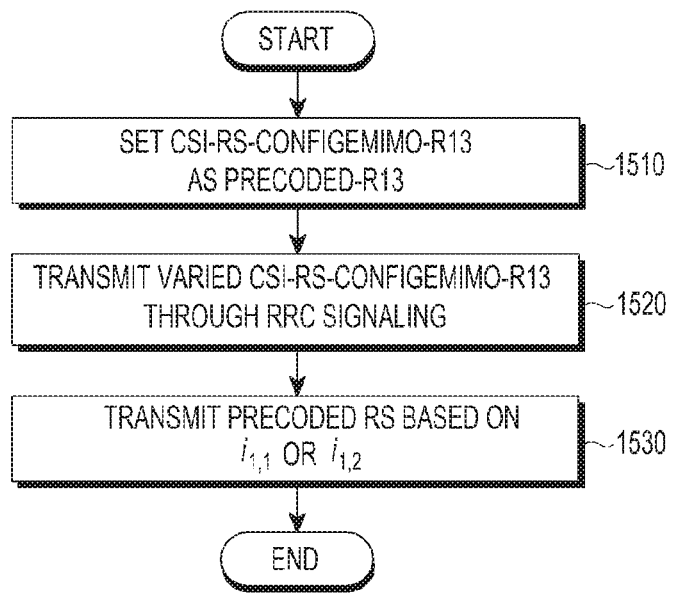
FIG. 15 illustrates control flows performed by a base station 110 to share reference signal configuration information (CSI-RS-configEMIMI-r13) with a UE 120 in a full-dimension multi-antenna system using 2D planar array antennas according to an embodiment.

FIG. 15 illustrates control flows performed by a base station 110 to share reference signal configuration information (CSI-RS-configEMIMI-r13) with a UE 120 in a full-dimension multi-antenna system using 2D planar array antennas according to an embodiment. The control flows of FIG. 15 assume a circumstance in which the base station 110 and the UE 120 are connected via first and second domain channels, and the base station 110 receive feedback of $CI_1$ and $CI_2$ one of which is 1 from the UE 120.

Referring to FIG. 15, the base station 110 sets reference signal configuration information (CSI-RS-configEMIMO-r13) as precoded-r13 in step 1510. That is, the reference signal configuration information (CSI-RS-configEMIMO-r13) may contain a precoded-r13.

The base station 110 may transmit the varied reference signal configuration information (CSI-RS-configEMIMO-r13) to the UE through RRC signaling. Thus, the base station 110 and the UE 120 may share the varied reference signal configuration information (CSI-RS-configEMIMO-r13) to enable the base station 110 to transmit the precoded reference signal and the UE 120 to receive the precoded reference signal so that channel estimation and CSI feedback may be performed.

Accordingly, the base station 110 may transmit the reference signal precoded based on $i_{1,1}$ or $i_{1,2}$ to the UE 120.

Figure 16:
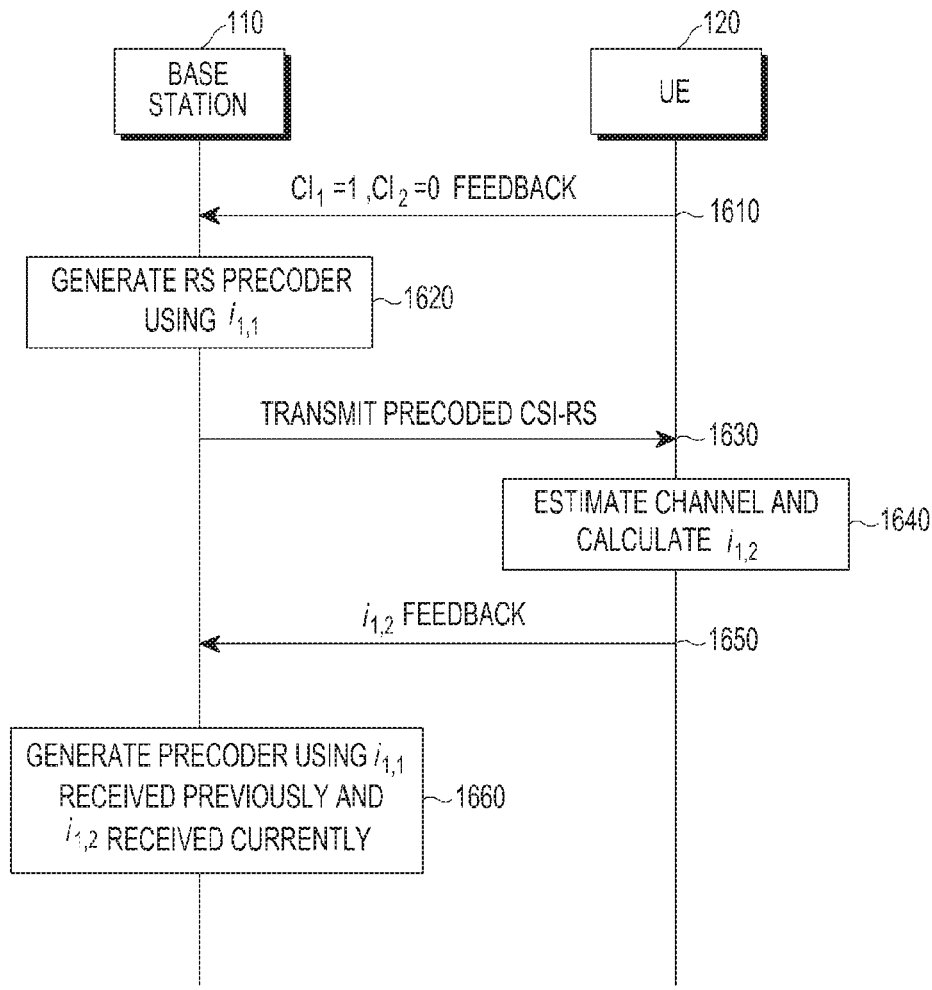
FIG. 16 illustrates a signal processing procedure for when $CI_1$ and $CI_2$ contained in feedback information are 1 and 0, respectively, in a full-dimension multi-antenna system using 2D planar array antennas according to an embodiment.

FIG. 16 illustrates a signal processing procedure for when $CI_1$ and $CI_2$ contained in feedback information are 1 and 0, respectively, in a full-dimension multi-antenna system using 2D planar array antennas according to an embodiment. The signal processing procedure of FIG. 16 assumes that the base station 110 and the UE 120 are connected via a first domain channel and a second domain channel.

Referring to FIG. 16, the UE 120 may set the number ($CI_1$) of eigen paths of the first domain channel as 1 and the number ($CI_2$) of eigen paths of the second domain channel as 0, and the UE 120 may feed $CI_1$ and $CI_2$ back to the base station 110 in step 1610. In this case, $CI_1$ set as 1 denotes that there is one eigen path for the first domain channel, and $CI_2$ set as 0 denotes that there are multiple eigen paths for the second domain channel.

The base station 110 may generate the precoder using $i_{1,1}$ in step 1620, and may precode the reference signal using the generated precoder and transmit the precoded reference signal to the UE 120 in step 1630.

The UE 120 may estimate the channel state based on the precoded reference signal received from the base station 110 and determine the second PMI ($i_{1,2}$) corresponding to the second domain channel based on the estimated channel state in step 1640, and may feed the determined $i_{1,2}$ back to the base station 110 in step 1650.

The base station 110 may generate the precoder using $i_{1,1}$ previously received and $i_{1,2}$ received in step 1650, in step 1660. The base station 110 may use the newly generated precoder using precoding on the reference signal to be sent afterwards.

Figure 17:
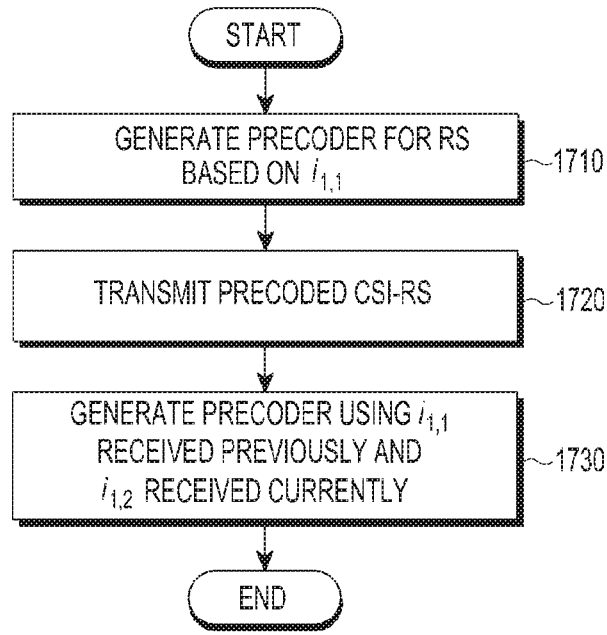
FIG. 17 illustrates control flows performed by a base station when $CI_1$ and $CI_2$ contained in feedback information are 1 and 0, respectively, in a full-dimension multi-antenna system using 2D planar array antennas according to an embodiment.

FIG. 17 illustrates control flows performed by a base station when $CI_1$ and $CI_2$ contained in feedback information are 1 and 0, respectively, in a full-dimension multi-antenna system using 2D planar array antennas according to an embodiment. The control flows of FIG. 17 assume that the base station 110 and the UE 120 are connected via a first domain channel and a second domain channel.

Referring to FIG. 17, upon receiving $CI_1$ set as 1 and $CI_2$ set as 0, the base station 110 may generate the precoder based on $i_{1,1}$ in step 1710, and may precode the reference signal using the generated precoder and transmit the precoded reference signal to the UE 120 in step 1720.

The base station 110 may receive the second PMI ($i_{1,2}$) corresponding to the second domain channel from the UE 120 and generate the precoder using $i_{1,1}$ previously received and $i_{1,2}$ currently received in step 1730, and may perform precoding on the reference signal using the newly generated precoder in the subsequent reference signal transmission period.

Figure 18:
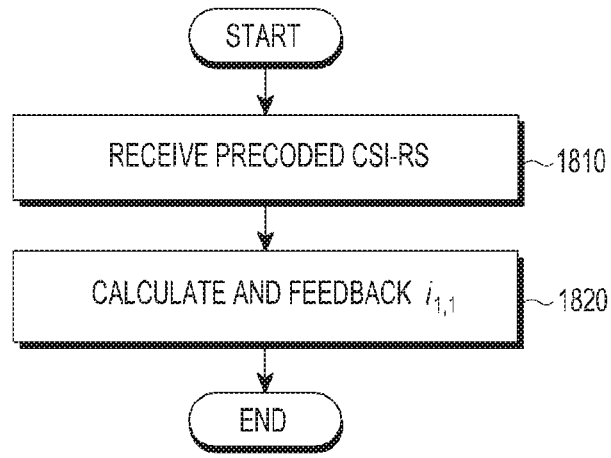
FIG. 18 illustrates control flows performed by a UE where $CI_1$ and $CI_2$ contained in feedback information are 1 and 0, respectively, in a full-dimension multi-antenna system using 2D planar array antennas according to an embodiment.

FIG. 18 illustrates control flows performed by a UE where $CI_1$ and $CI_2$ contained in feedback information are 1 and 0, respectively, in a full-dimension multi-antenna system using 2D planar array antennas according to an embodiment. The control flows of FIG. 18 assume that the base station 110 and the UE 120 are connected via a first domain channel and a second domain channel.

Referring to FIG. 18, after transmitting $CI_1$ set as 1 and $CI_2$ set as 0 to the base station 110, the UE 120 may receive the precoded reference signal from the base station in step 1810. The base station 110 may estimate the channel state based on the precoded reference signal received and determine the second PMI ($i_{1,2}$) corresponding to the second domain channel based on the estimated channel state. The UE 120 may feed the determined $i_{1,2}$ back to the base station 110 in step 1820.

Figure 19:
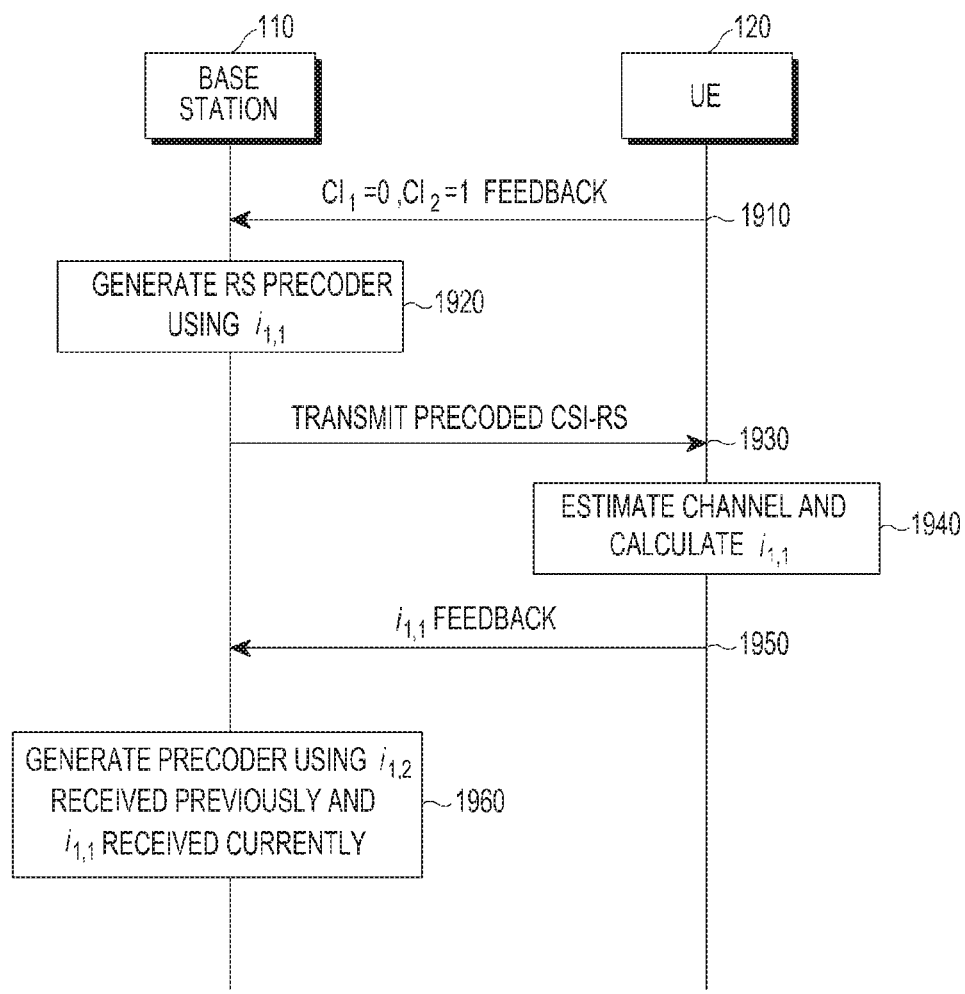
FIG. 19 illustrates a signal processing procedure for when $CI_1$ and $CI_2$ contained in feedback information are 0 and 1, respectively, in a full-dimension multi-antenna system using 2D planar array antennas according to an embodiment.

FIG. 19 illustrates a signal processing procedure for when $CI_1$ and $CI_2$ contained in feedback information are 0 and 1, respectively, in a full-dimension multi-antenna system using 2D planar array antennas according to an embodiment. The signal processing procedure of FIG. 19 assumes that the base station 110 and the UE 120 are connected via a first domain channel and a second domain channel.

Referring to FIG. 19, the UE 120 may set the number ($CI_1$) of eigen paths of the first domain channel as 0 and the number ($CI_2$) of eigen paths of the second domain channel as 1, and the UE 120 may feed $CI_1$ and $CI_2$ back to the base station 110 in step 1910. In this case, $CI_1$ set as 0 denotes that there are multiple eigen paths for the first domain channel, and $CI_2$ set as 1 denotes that there is one eigen path for the second domain channel.

The base station 110 may generate the precoder using $i_{1,2}$ in step 1920, and may precode the reference signal using the generated precoder and transmit the precoded reference signal to the UE 120 in step 1930.

The UE 120 may estimate the channel state based on the precoded reference signal received from the base station 110 and determine the first PMI ($i_{1,1}$) corresponding to the first domain channel based on the estimated channel state in step 1940. The UE 120 may feed the determined $i_{1,1}$ back to the base station 110 in step 1950.

The base station 110 may generate the precoder using $i_{1,2}$ previously received and $i_{1,1}$ received in operation 1950 in step 1960. The base station 110 may use the newly generated precoder using precoding on the reference signal to be sent afterwards.

Figure 20:
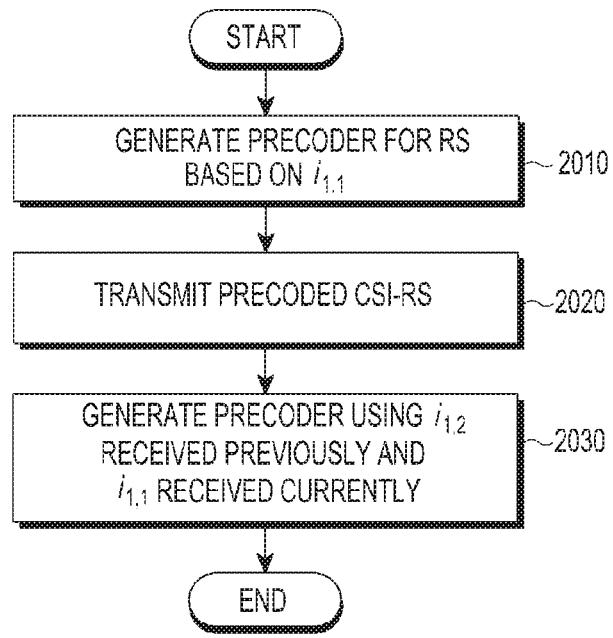
FIG. 20 illustrates control flows performed by a base station when $CI_1$ and $CI_2$ contained in feedback information are 0 and 1, respectively, in a full-dimension multi-antenna system using 2D planar array antennas according to an embodiment.

FIG. 20 illustrates control flows performed by a base station when $CI_1$ and $CI_2$ contained in feedback information are 0 and 1, respectively, in a full-dimension multi-antenna system using 2D planar array antennas according to an embodiment. The control flows of FIG. 20 assume that the base station 110 and the UE 120 are connected via a first domain channel and a second domain channel.

Referring to FIG. 20, upon receiving $CI_1$ set as 0 and $CI_2$ set as 1, the base station 110 may generate the precoder based on $i_{1,2}$ in step 2010. The base station 110 may precode the reference signal using the generated precoder and transmit the precoded reference signal to the UE 120 in step 2020.

The base station 110 may receive the first PMI ($i_{1,1}$) corresponding to the first domain channel from the UE 120 and generate the precoder using $i_{1,2}$ previously received and $i_{1,1}$ currently received in step 2030, and may perform precoding on the reference signal using the newly generated precoder in the subsequent reference signal transmission period.

Figure 21:
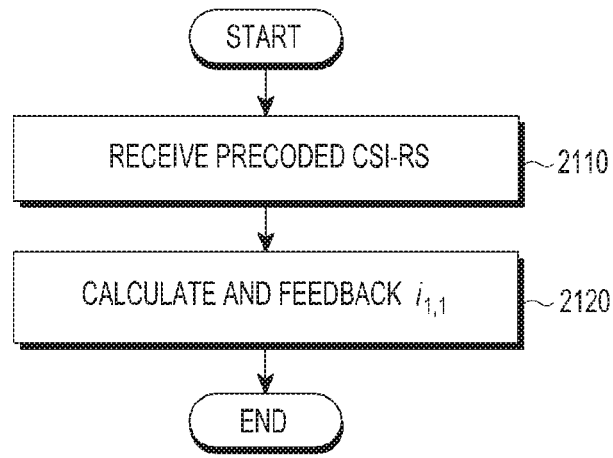
FIG. 21 illustrates control flows performed by a UE where $CI_1$ and $CI_2$ contained in feedback information are 0 and 1, respectively, in a full-dimension multi-antenna system using 2D planar array antennas according to an embodiment.

FIG. 21 illustrates control flows performed by a UE where $CI_1$ and $CI_2$ contained in feedback information are 0 and 1, respectively, in a full-dimension multi-antenna system using 2D planar array antennas according to an embodiment. The control flows of FIG. 21 assume that the base station 110 and the UE 120 are connected via a first domain channel and a second domain channel.

Referring to FIG. 21, after transmitting $CI_1$ set as 0 and $CI_2$ set as 1 to the base station 110, the UE 120 may receive the precoded reference signal from the base station in step 2110. The base station 110 may estimate the channel state based on the precoded reference signal received and determine the first PMI ($i_{1,1}$) corresponding to the first domain channel based on the estimated channel state. The UE 120 may feed the determined $i_{1,1}$ back to the base station 110 in step 2120.

Figure 22:
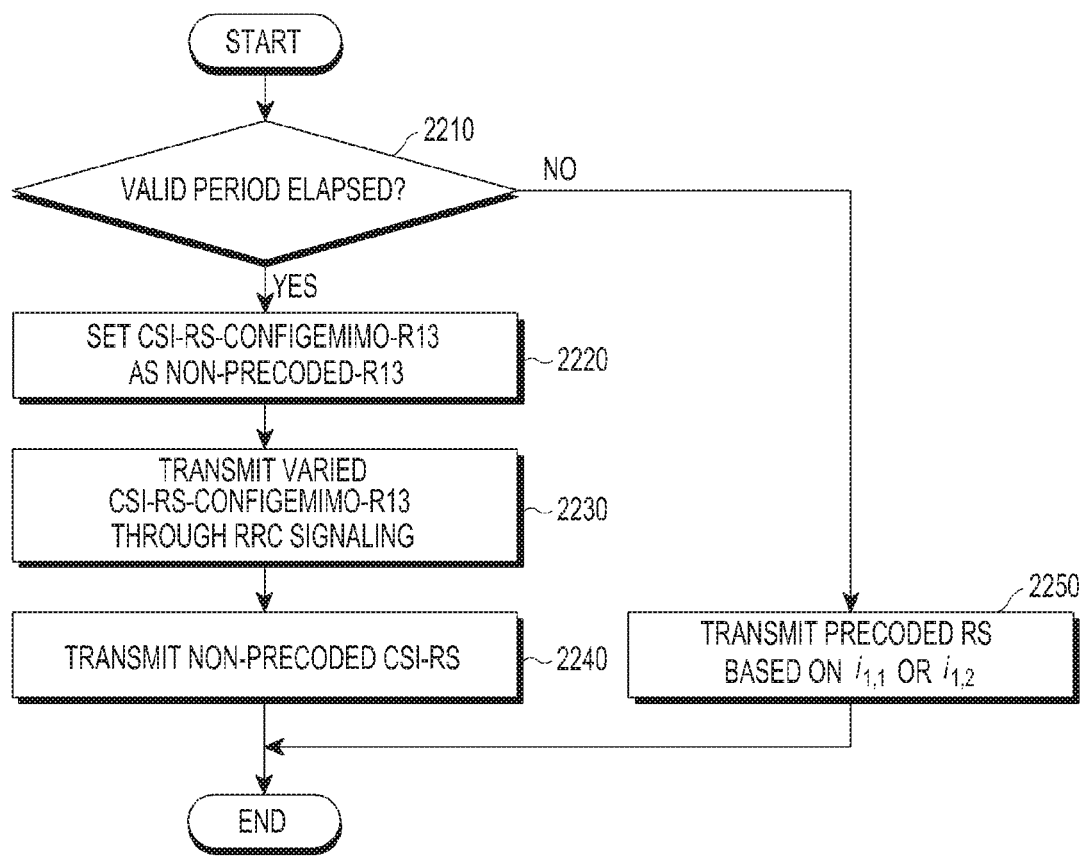
FIG. 22 illustrates control flows for a base station 110 to transmit precoded reference signals in a full-dimension multi-antenna system using 2D planar array antennas according to an embodiment.

FIG. 22 illustrates control flows for a base station 110 to transmit precoded reference signals in a full-dimension multi-antenna system using 2D planar array antennas according to an embodiment. The control flows of FIG. 22 assume that the base station 110 and the UE 120 are connected via a first domain channel and a second domain channel.

Referring to FIG. 22, the base station 110 may monitor whether a valid period has elapsed in step 2210, which may be determined by comparing the transmission time of precoded reference signal with time_precoded_RS and determining the result. For example, when the transmission time of the precoded reference signal is greater than time_precoded_RS, the valid period may be determined to have elapsed. Otherwise, when the transmission time of the precoded reference signal is not greater than time_precoded_RS, the valid period may be determined as yet to have elapsed.

Upon determining that the valid period has elapsed, the base station 110 may set CSI-RS-configEMIMO-r13 as non-Precoded-r13 in step 2220. The base station 110 may transmit CSI-RS-configEMIMO-r13 set as non-Precoded-r13 to the UE 120 through radio resource control (RRC) signaling in step 2230, and may transmit non-Precoded CSI-RS to the UE 120 in step 2240.

Unless the valid period has elapsed, the base station 110 may transmit the reference signal precoded based on $i_{1,1}$ or $i_{1,2}$ to the UE 120.

As is apparent from the foregoing description, according to an embodiment, in a full-dimension multi-antenna system using 2D planar array antennas, a composite JR obtained by multiplying the respective RIs of two channel domains may be rendered consistent with a JR used in actual transmission. As the UE transmits CIs each corresponding to a respective one of two channel domains to the base station, feedback overhead and reference signal overhead may be reduced.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. A method for reporting feedback information to a base station by a user equipment (UE) in a multi-antenna system using array antennas, the method comprising:
   estimating channel states, each of the channel states corresponding to a respective one of multiple domain channels connecting the UE with the base station by a reference signal received from the base station;
   obtaining precoding matrix indicators (PMIs), each of the PMIs corresponding to a respective one of the multiple domain channels, and rank indicators (RIs), each of the RIs corresponding to a respective one of the multiple domain channels, based on the estimated channel states;
   determining a joint rank indicator (JRI) using the obtained PMIs and the RIs;
   transmitting the feedback information containing the determined JRI to the base station; and
   receiving, from the base station, data containing a zero layer from the base station based on the determined JRI.

2. The method of claim 1,
   wherein determining the JRI includes:
   calculating a joint rank (JR) based on the obtained PMIs,
   calculating a composite rank (CR) by the product of the obtained RIs, and
   setting the JRI by a result of a comparison between the calculated JR and the calculated CR.

3. The method of claim 2,
   wherein setting the JRI includes:
   setting the JRI as 0 when the calculated JR is equal to the calculated CR, and
   setting the JRI as a difference between the calculated JR and the calculated CR when the calculated JR is not equal to the calculated CR.

4. The method of claim 1, further comprising:
   determining a non-zero layer index (NLI) that is index information of the zero layer to be transmitted by the base station and removing inter-layer interference based on the determined JRI and the obtained RIs and PMIs,
   wherein the determined NLI is contained in the feedback information and is transmitted to the base station.

5. The method of claim 1,
   wherein the feedback information further contains the obtained PMIs and RIs, and correlation indicators (CIs), each of the CIs corresponding to a respective one of the multiple domain channels.

6. The method of claim 1, further comprising transmitting a sounding reference signal (SRS) to the base station after transmitting the feedback information to the base station.

7. A user equipment (UE) reporting feedback information to a base station in a multi-antenna system using array antennas, the UE comprising:
   a transceiver; and
   a processor coupled with the transceiver and configured to:
   control the transceiver to receive a reference signal from the base station and transmit the feedback information to the base station,
   estimate channel states, each of the channel states corresponding to a respective one of multiple domain channels connecting the UE with the base station by a reference signal received from the base station, obtain precoding matrix indicators (PMIs), each of the PMIs corresponding to a respective one of the multiple domain channels, and rank indicators (RIs), each of the RIs corresponding to a respective one of the multiple domain channels, based on the estimated channel states, determine a joint rank indicator (JRI) using the obtained PMIs and the RIs, configure the feedback information containing the determined JRI, and control the transceiver to receive, from the base station, data containing a zero layer based on the determined JRI.

8. The UE of claim 7, wherein the processor is further configured to calculate a joint rank (JR) based on the obtained PMIs, calculate a composite rank (CR) by the product of the obtained RIs, and set the JRI as 0 when the calculated JR is equal to the calculated CR and as a difference between the calculated JR and the calculated CR when the calculated JR is not equal to the calculated CR.

9. The UE of claim 7, wherein the processor is further configured to determine a non-zero layer index (NLI) that is index information of the zero layer to be transmitted by the base station to remove inter-layer interference based on the determined JRI and the obtained RIs and PMIs and configure the feedback information to contain the determined NLI, the obtained PMIs and RIs, and correlation indicators (CIs), each of the CIs corresponding to a respective one of the multiple domain channels.

10. The UE of claim 9, wherein the processor is further configured to control the transceiver to:

transmit a sounding reference signal (SRS) to the base station, after transmitting the feedback information to the base station.

* * * * *